United States Patent
Damodaran et al.

(10) Patent No.: US 12,381,773 B2
(45) Date of Patent: Aug. 5, 2025

(54) SYSTEMS AND METHODS FOR REDUCING ALERT FATIGUE DURING OPERATION OF CYBER-PHYSICAL SYSTEMS

(71) Applicant: The MITRE Corporation, McLean, VA (US)

(72) Inventors: Suresh K. Damodaran, Burlington, MA (US); Jesus N. Abelarde, Jr., Stow, MA (US); Benjamin Robert Schmidt, Acton, MA (US); Peter Malinovsky, Arlington, MA (US); Bryan Lewis Quinn, Amesbury, MA (US)

(73) Assignee: The MITRE Corporation, McLean, VA (US)

(*) Notice: Subject to any disclaimer, the term of this patent is extended or adjusted under 35 U.S.C. 154(b) by 317 days.

(21) Appl. No.: 17/862,193

(22) Filed: Jul. 11, 2022

(65) Prior Publication Data

US 2024/0015062 A1   Jan. 11, 2024

(51) Int. Cl.
*H04L 41/0604* (2022.01)
*G06F 11/30* (2006.01)
(Continued)

(52) U.S. Cl.
CPC ...... *H04L 41/0604* (2013.01); *G06F 11/3006* (2013.01); *G06F 11/3072* (2013.01);
(Continued)

(58) Field of Classification Search
CPC . H04L 41/0604; H04L 41/0893; H04L 41/16; H04L 63/1408; H04L 63/1416;
(Continued)

(56) References Cited

U.S. PATENT DOCUMENTS 8,079,080 B2 * 12/2011 Borders ............... G06F 21/606
                                                  726/13
9,870,678 B2    1/2018 Schlesinger et al.
(Continued)

OTHER PUBLICATIONS

Hassan, et al., Nodoze: Combatting Threat Alert Fatigue with Automated Provenance Triage, 2019, Network and Distributed Systems Security (NDSS) Symposium, pp. 1-15.*

(Continued)

*Primary Examiner* — Lynn D Feild
*Assistant Examiner* — Abdullah Almamun
(74) *Attorney, Agent, or Firm* — Morrison & Foerster LLP

(57) ABSTRACT

Disclosed herein are systems and methods for reducing or mitigation alert fatigue from real-time alerts in cyber-physical systems or other types of edge computing systems are provided. In one or more examples, the edge computing system monitor can look for one or more patterns within received data that can indicate malicious activity or other conditions that may warrant a real-time or near-real time response from the operator. In one or more examples, a detection of any of the specified patterns in the streaming data can trigger an alert to the operator of the edge computing system. In one or more examples, the alerts can be suppressed until the number of alerts associated with a particular pattern crosses a pre-determined threshold. Additionally or alternatively, alerts can be suppressed based on a duration that the alerts have been generated. The suppression of alerts can be configured to reduce operator alert fatigue.

21 Claims, 16 Drawing Sheets

(51) Int. Cl.
*G06F 18/00* (2023.01)
*G06F 21/50* (2013.01)
*G06N 20/00* (2019.01)
*H04L 9/40* (2022.01)
*H04L 41/0893* (2022.01)
*H04L 41/16* (2022.01)

(52) U.S. Cl.
CPC .............. *G06F 18/00* (2023.01); *G06F 21/50* (2013.01); *G06N 20/00* (2019.01); *H04L 41/0893* (2013.01); *H04L 41/16* (2013.01); *H04L 63/1408* (2013.01); *H04L 63/1416* (2013.01)

(58) Field of Classification Search
CPC .. G06F 11/3006; G06F 11/3072; G06F 18/00; G06F 21/50
See application file for complete search history.

(56) References Cited

U.S. PATENT DOCUMENTS

| | | | |
|---|---|---|---|
| 10,813,580 B2 | 10/2020 | Dyell et al. | |
| 11,095,589 B1* | 8/2021 | Soni ...................... | H04L 51/214 |
| 11,133,977 B2 | 9/2021 | Friedrichs et al. | |
| 11,838,329 B1* | 12/2023 | Lopes ................... | H04L 63/205 |
| 2007/0297610 A1* | 12/2007 | Chen ...................... | H04L 9/083 |
| | | | 380/270 |
| 2011/0270967 A1* | 11/2011 | Qiu ....................... | H04L 65/765 |
| | | | 709/227 |
| 2013/0275444 A1* | 10/2013 | Dow ..................... | G06F 16/335 |
| | | | 707/754 |
| 2015/0154062 A1* | 6/2015 | Watanabe ........... | G06F 11/0727 |
| | | | 714/26 |
| 2017/0099309 A1* | 4/2017 | Di Pietro ............ | H04L 63/1425 |
| 2017/0193395 A1* | 7/2017 | Limonad ................ | G06N 20/00 |
| 2017/0193801 A1* | 7/2017 | Bala ....................... | G16H 40/67 |
| 2017/0308650 A1* | 10/2017 | Brill ....................... | G16H 10/60 |
| 2018/0053207 A1* | 2/2018 | Modani .............. | G06Q 30/0244 |
| 2018/0219875 A1 | 8/2018 | Bania et al. | |
| 2019/0340048 A1* | 11/2019 | Brown ................ | G06F 11/0724 |
| 2020/0184573 A1* | 6/2020 | Balaji .................... | G06Q 50/01 |
| 2020/0186548 A1* | 6/2020 | Alagar .................... | H04L 67/02 |
| 2021/0166548 A1* | 6/2021 | Ellam .................. | G08B 21/182 |
| 2022/0293259 A1* | 9/2022 | Batman .................. | G16H 40/67 |
| 2022/0345469 A1* | 10/2022 | Domagalski ........ | H04L 63/0236 |
| 2023/0161661 A1* | 5/2023 | Higgins ............. | G06F 11/0772 |
| | | | 714/37 |
| 2023/0224311 A1* | 7/2023 | Meshi ................. | H04L 63/1416 |
| | | | 726/22 |

OTHER PUBLICATIONS (Aug. 4, 2017). "Deception networks: Reducing alert fatigue and increasing security through an alternate reality" located at embeddedcomputing.com/technology/security/deception-networks-reducing-alert-fatigue-and-increasing-securitythrough-an-alternate-reality. (6 pages).

Black (Jun. 28, 2018). "The importance of actionable alerts: Reducing alert fatigue to improve clinical decision support" located at https://www.hcinnovationgroup.com/home/article/13010176/the-importance-of-actionable-alerts-reducing-alert-fatigue-to-improve-clinical-decision-support, visited on Oct. 14, 2021. (12 pages).

Iglesias et al. (Apr. 2019). "Industrial Cyber-Physical System Evolution Detection and Alert Generation", Applied Sciences 9 (1586): 24 pages.

* cited by examiner

SYSTEMS AND METHODS FOR REDUCING ALERT FATIGUE DURING OPERATION OF CYBER-PHYSICAL SYSTEMS

STATEMENT REGARDING FEDERALLY SPONSORED RESEARCH OR DEVELOPMENT

This invention was made with Government support under U.S. Government Contracts No. W15P7T-13-C-A802, W56KGU-18-D-0004, FA8702-14-C-0001, and FA8702-19-C-0001, awarded by the Department of Defense. The Government has certain rights in this invention.

FIELD OF THE DISCLOSURE

This disclosure relates to systems and methods for operating edge computing systems in cyber-physical systems, and specifically to systems and methods for reducing the number of alerts transmitted to edge computing system operators during system operation.

BACKGROUND OF THE DISCLOSURE

Enterprise and organizational computing systems often comprise a plurality of complex systems that are interconnected with one another to collectively carry out the mission of the organization. Cyber-physical systems are a classic example of these types of computing systems. Cyber-physical systems can often be characterized as a plurality of edge computing systems that consist of sensors, actuators, devices, and computing hardware that are centrally controlled by an enterprise. While, cyber-physical systems, and particularly the edge computing systems of the cyber-physical system may be centrally controlled, often operation of the systems requires human operators to be physically present at the edge computing centers to monitor and manage the edge computing systems.

Cyber physical system operators who oversee systems such as medical devices, Internet of Things (IoT) devices, manufacturing plants, sewage plants, and vehicles are knowledgeable about the systems and devices that they operate, but usually not about cyber security or methods for addressing cyber-attacks that may occur during operation of edge systems. For this reason, these operators need to have easy to understand approaches for detecting and responding to cyber-attacks that account both for operators' reluctance to permit automated system responses due to the sensitive nature of the systems they operate and the requirement to obtain permission to act from higher authorities or the need to work through bureaucratic processes. The method employed to facilitate operator responses to cyber-security events must be suited to the operational environment that an edge computing system operator commonly works in. An edge computing system operator will often work in tactical environments or in otherwise degraded operating conditions with distractions and physical inconveniences such as poor lighting, noise, etc. Finally, a system deployed at a geographically remote or otherwise remote environment needs access control and audits to enhance the security of the operations of the edge monitoring system. These security considerations are only minimally addressed, if at all, by the current edge monitoring systems.

Furthermore, an operator may be subjected to numerous alerts from the edge computing system during operation of the system. Many of the alerts, while configured to alert the operator to a real-time condition of the system that may be indicative of a cyber-threat or other type of anomaly, may also be false positive alerts, in that they are alerts that are generated from legitimate activity of the edge computing system. Incidents in a cyber-physical system can occur due to cyber-attacks, physical attacks, human errors, or accidents. True positive alerts result from a genuine incident, whereas false positive alerts falsely indicate an incident. When an operator is subjected to both true and false positives, alert fatigue may set in, wherein the operator may begin to ignore alerts due to the volume of alerts being received, and the fact that many of the alerts are false positives. Alert fatigue is driven by repeated generation of either true positive alerts or false positive alerts for the same incident. In either case, the large number of often repetitive alerts has these negative consequences: (1) the alerts are ignored, (2) true positive alerts are missed, and (3) the alerts take too long to analyze, (4) increased use of human and system resources for analysis. This issue is even more critical for cyber-physical systems with limited size, weight, and power. Therefore, it is important to address the problem of alert fatigue for effective monitoring of security threats, especially in in cyber-physical systems.

SUMMARY OF THE DISCLOSURE

Accordingly, systems and methods for reducing or mitigation alert fatigue from real-time alerts in cyber-physical systems or other types of edge computing systems are provided. In one or more examples, an edge computing system (where an operator is stationed to operate it) can be interconnected with an enterprise computing network to comprise an edge computing system monitor. In one or more examples, the edge computing system monitor can receive data from one or more components of the edge computing system. In one or more examples, the edge computing system monitor can look for one or more patterns within the received data that can indicate malicious activity or other conditions that may warrant a real-time or near-real time response from the operator. In one or more examples, a detection of any of the specified patterns in the streaming data can trigger an alert to the operator of the edge computing system.

In one or more examples, the patterns in the data from the edge computing system can be analyzed using a domain-specific Happened-Before-Language (HBL) to detect order dependent or independent properties among message logs using defined happened-before (HB) relationships among the messages, components, and variable system component values. The language enables identification of message types, components, and logical expressions involving message variables and component variables. Watch points may be defined using HBL to detect specific conditions of the variable values and message type occurrence. Detection of the watch points may be done in real time by performing analysis on a real-time stream of data being transmitted among nodes in the distributed software system.

In one or more examples, in addition to specifying watch points that can trigger alerts to the operator, the systems and methods can also include one or more processes for determining which alerts generated by the watch points should be shown to the operator of the edge computing system. In one or more examples, the edge computing monitor can be configured to suppress alerts produced by a given watch point once the number of alerts produced by the watch point exceeds a pre-determined threshold. In one or more examples, the edge computing monitor can be configured to suppress alerts produced by a given watch point once the number of alerts produced by the watch point exceeds a pre-determined threshold, and a duration of an alert period is below a pre-determined time threshold.

In one or more examples, the edge computing monitor can be configured to create a generated list based on the one or more messages being received from the components of the edge computing system. In one or more examples, the generated list can include information about components that are communicating with one another as part of the operation of the edge computing system such as IP Address or MAC Address of the components and can also include information about relationships between components. In one or more examples, a user can curate the generated list by indicating which of the identified components and relationships are legitimate and authorized operations, and which are not. In one or more examples, the curated generated list (referred to as a seen-list) can be loaded into one or more streaming analytic engines belonging to the edge computing monitor. In one or more examples, if a watch point deployed on a streaming analytic engine generates an alert (i.e., a pattern or condition specified by the watch point is found to be present in the streaming data) then the alert can be compared with the seen-list to determine if the alert involves components and/or relationships between components that have been already approved by operator in the seen-list. If the alert matches the components and/or relationships found in the seen-list, then in one or more examples, the alert can be suppressed so that it is not transmitted to the operator. If, however, the alert does not pertain to the seen-list, then the alert can be transmitted to the operator for further investigation. In one or more examples, the edge computing system monitor can also generate a configuration model and behavior model that can also be used by the monitor to suppress alerts.

In one or more examples, a method for reducing a number of alerts provided to an edge computing system operator comprises: receiving one or more messages transmitted between a plurality of components of the edge computing system, receiving a list of information pertaining to the received one or more messages transmitted between a plurality of components of the edge computing system, wherein the received list of information comprises information pertaining to one or more components identified in the received one or more messages, receiving one or more modifications to the received list of information from the edge computing system operator to generate a seen-list, wherein the seen-list comprises one or more components in the list of information that has been authorized by an operator of the edge computing system; receiving one or more specifications of conditions to search for within the received one or more messages, converting the one or more conditions into one or more watch points, wherein each watch point defines a pattern to be searched for in the data transmitted between the plurality of components, determining the presence of one or more patterns within the received data based on the one or more watch points, and if the one or more patterns within the received data are determined to be present: generating an alert, and suppressing the alert from being transmitted to an operator of the edge computing system based on a comparison between the one or more patterns in the received data and the seen-list.

Additionally or alternatively, the received list of information comprises one or more relationships between the one or more components of the edge computing system.

Additionally or alternatively, the information pertaining to the one or more components identified in the received one or more messages comprises a plurality of MAC addresses, each MAC address associated with a component of the plurality of components of the edge computing system contained within the received list of information.

Additionally or alternatively, the information pertaining to the one or more components identified in the received one or more messages comprises a plurality of IP addresses, each IP address associated with a component of the plurality of components of the edge computing system contained within the received list of information.

Additionally or alternatively, the method comprises receiving a second list of information pertaining to the received one or more messages transmitted between a plurality of components of the edge computing system, wherein the second list of information is generated by comparing the received one or more messages to the seen-list.

Additionally or alternatively, the method comprises receiving one or more modifications to the received second list of information from the edge computing system operator to generate one or more modifications to the seen-list.

Additionally or alternatively, the received list of information is generated using one or more machine learning models that are applied to the received one or more messages.

In one or more examples, a method for reducing a number of alerts provided to an edge computing system operator comprises: receiving one or more messages transmitted between a plurality of components of the edge computing system, receiving one or more specifications of conditions to search for within the received one or more messages, converting the one or more conditions into one or more watch points, wherein each watch point defines a pattern to be searched for in the data transmitted between the plurality of components, determining the presence of one or more patterns within the received data based on the one or more watch points, if the one or more patterns within the received data are determined to be present: generating an alert, incrementing a value of a counter, wherein the counter is configured to count the number of alerts that have been generated for the edge computing system, comparing the value of the counter to a pre-determined threshold, and if the value of the counter is below the pre-determined threshold: transmitting the alert to the operator of the edge computing system.

In one or more examples, a method for reducing an amount of alerts provided to an edge computing system operator comprises: initializing a timer, receiving one or more messages transmitted between a plurality of components of the edge computing system, receiving one or more specifications of conditions to search for within the received one or more messages, converting the one or more conditions into one or more watch points, wherein each watch point defines a pattern to be searched for in the data transmitted between the plurality of components, determining the presence of one or more patterns within the received data based on the one or more watch points, if the one or more patterns within the received data are determined to be present: generating an alert, incrementing a value of a counter, wherein the counter is configured to count the number of alerts that have been generated for the edge computing system, comparing the value of the counter to a pre-determined threshold, comparing the timer to a pre-determined time threshold, and if the value of the counter is below the pre-determined threshold and the timer is below the pre-determined time threshold: transmitting the alert to the operator of the edge computing system.

In one or more examples, a computing system for reducing an amount of alerts provided to an edge computing system operator comprises: a display, a user interface configured to receive inputs from a user of the system, a memory, one or more processors, and one or more programs, wherein the one or more programs are stored in the memory and configured to be executed by the one or more processors, the one or more programs when executed by the one or more processors cause the processor to: receive one or more messages transmitted between a plurality of components of the edge computing system, receive a list of information pertaining to the received one or more messages transmitted between a plurality of components of the edge computing system, wherein the received list of information comprises information pertaining to one or more components identified in the received one or more messages, receive one or more modifications to the received list of information from the edge computing system operator to generate a seen-list, wherein the seen-list comprises one or more components in the list of information that has been authorized by an operator of the edge computing system, receive one or more specifications of conditions to search for within the received one or more messages, convert the one or more conditions into one or more watch points, wherein each watch point defines a pattern to be searched for in the data transmitted between the plurality of components, determine the presence of one or more patterns within the received data based on the one or more watch points, and if the one or more patterns within the received data are determined to be present: generate an alert, and suppress the alert from being transmitted to an operator of the edge computing system based on a comparison between the one or more patterns in the received data and the seen-list.

Additionally or alternatively, the received list of information comprises one or more relationships between the one or more components of the edge computing system.

Additionally or alternatively, the information pertaining to the one or more components identified in the received one or more messages comprises a plurality of MAC addresses, each MAC address associated with a component of the plurality of components of the edge computing system contained within the received list of information.

Additionally or alternatively, the information pertaining to the one or more components identified in the received one or more messages comprises a plurality of IP addresses, each IP address associated with a component of the plurality of components of the edge computing system contained within the received list of information.

Additionally or alternatively, the one or more processors are caused to receive a second list of information pertaining to the received one or more messages transmitted between a plurality of components of the edge computing system, wherein the second list of information is generated by comparing the received one or more messages to the seen-list.

Additionally or alternatively, the one or more processors are caused to receive one or more modifications to the received second list of information from the edge computing system operator to generate one or more modifications to the seen-list.

Additionally or alternatively, the received list of information is generated using one or more machine learning models that are applied to the received one or more messages.

In one or more examples, a computing system or reducing a number of alerts provided to an edge computing system operator comprises: a display, a user interface configured to receive inputs from a user of the system, a memory, one or more processors, and one or more programs, wherein the one or more programs are stored in the memory and configured to be executed by the one or more processors, the one or more programs when executed by the one or more processors cause the processor to: receive one or more messages transmitted between a plurality of components of the edge computing system, receive one or more specifications of conditions to search for within the received one or more messages, convert the one or more conditions into one or more watch points, wherein each watch point defines a pattern to be searched for in the data transmitted between the plurality of components, determine the presence of one or more patterns within the received data based on the one or more watch points, if the one or more patterns within the received data are determined to be present: generate an alert, increment a value of a counter, wherein the counter is configured to count the number of alerts that have been generated for the edge computing system, compare the value of the counter to a pre-determined threshold, and if the value of the counter is below the pre-determined threshold: transmit the alert to the operator of the edge computing system.

In one or more examples, a computing system or reducing an amount of alerts provided to an edge computing system operator comprises: a display, a user interface configured to receive inputs from a user of the system, a memory, one or more processors, and one or more programs, wherein the one or more programs are stored in the memory and configured to be executed by the one or more processors, the one or more programs when executed by the one or more processors cause the processor to: initialize a timer, receive one or more messages transmitted between a plurality of components of the edge computing system, receive one or more specifications of conditions to search for within the received one or more messages, convert the one or more conditions into one or more watch points, wherein each watch point defines a pattern to be searched for in the data transmitted between the plurality of components, determine the presence of one or more patterns within the received data based on the one or more watch points, if the one or more patterns within the received data are determined to be present: generate an alert, increment a value of a counter, wherein the counter is configured to count the number of alerts that have been generated for the edge computing system, compare the value of the counter to a pre-determined threshold, compare the timer to a pre-determined time threshold; and if the value of the counter is below the pre-determined threshold and the timer is below the pre-determined time threshold: transmit the alert to the operator of the edge computing system.

In one or more examples, a non-transitory computer readable storage medium storing one or more programs for reducing an amount of alerts provided to an edge computing system operator, the one or more programs comprising instructions, which, when executed by an electronic device with a display and a user input interface, cause the device to: receive one or more messages transmitted between a plurality of components of the edge computing system, receive a list of information pertaining to the received one or more messages transmitted between a plurality of components of the edge computing system, wherein the received list of information comprises information pertaining to one or more components identified in the received one or more messages, receive one or more modifications to the received list of information from the edge computing system operator to generate a seen-list, wherein the seen-list comprises one or more components in the list of information that has been authorized by an operator of the edge computing system, receive one or more specifications of conditions to search for within the received one or more messages, convert the one or more conditions into one or more watch points, wherein each watch point defines a pattern to be searched for in the data transmitted between the plurality of components, determine the presence of one or more patterns within the received data based on the one or more watch points, and if the one or more patterns within the received data are determined to be present: generate an alert, and suppress the alert from being transmitted to an operator of the edge computing system based on a comparison between the one or more patterns in the received data and the seen-list.

Additionally or alternatively, the received list of information comprises one or more relationships between the one or more components of the edge computing system.

Additionally or alternatively, the information pertaining to the one or more components identified in the received one or more messages comprises a plurality of MAC addresses, each MAC address associated with a component of the plurality of components of the edge computing system contained within the received list of information.

Additionally or alternatively, the information pertaining to the one or more components identified in the received one or more messages comprises a plurality of IP addresses, each IP address associated with a component of the plurality of components of the edge computing system contained within the received list of information.

Additionally or alternatively, the one or more processors are caused to receive a second list of information pertaining to the received one or more messages transmitted between a plurality of components of the edge computing system, wherein the second list of information is generated by comparing the received one or more messages to the seen-list.

Additionally or alternatively, the one or more processors are caused to receive one or more modifications to the received second list of information from the edge computing system operator to generate one or more modifications to the seen-list.

Additionally or alternatively, the received list of information is generated using one or more machine learning models that are applied to the received one or more messages.

In one or more examples, a non-transitory computer readable storage medium storing one or more programs for reducing an amount of alerts provided to an edge computing system operator, the one or more programs comprising instructions, which, when executed by an electronic device with a display and a user input interface, cause the device to: receive one or more messages transmitted between a plurality of components of the edge computing system, receive one or more specifications of conditions to search for within the received one or more messages, convert the one or more conditions into one or more watch points, wherein each watch point defines a pattern to be searched for in the data transmitted between the plurality of components, determine the presence of one or more patterns within the received data based on the one or more watch points, if the one or more patterns within the received data are determined to be present: generate an alert, increment a value of a counter, wherein the counter is configured to count the number of alerts that have been generated for the edge computing system, compare the value of the counter to a pre-determined threshold, and if the value of the counter is below the pre-determined threshold: transmit the alert to the operator of the edge computing system.

In one or more examples, a non-transitory computer readable storage medium storing one or more programs for reducing an amount of alerts provided to an edge computing system operator, the one or more programs comprising instructions, which, when executed by an electronic device with a display and a user input interface, cause the device to: initialize a timer, receive one or more messages transmitted between a plurality of components of the edge computing system, receive one or more specifications of conditions to search for within the received one or more messages, convert the one or more conditions into one or more watch points, wherein each watch point defines a pattern to be searched for in the data transmitted between the plurality of components, determine the presence of one or more patterns within the received data based on the one or more watch points, if the one or more patterns within the received data are determined to be present: generate an alert, increment a value of a counter, wherein the counter is configured to count the number of alerts that have been generated for the edge computing system, compare the value of the counter to a pre-determined threshold, compare the timer to a pre-determined time threshold, and if the value of the counter is below the pre-determined threshold and the timer is below the pre-determined time threshold: transmit the alert to the operator of the edge computing system.

DETAILED DESCRIPTION OF THE DISCLOSURE

Figure 1:
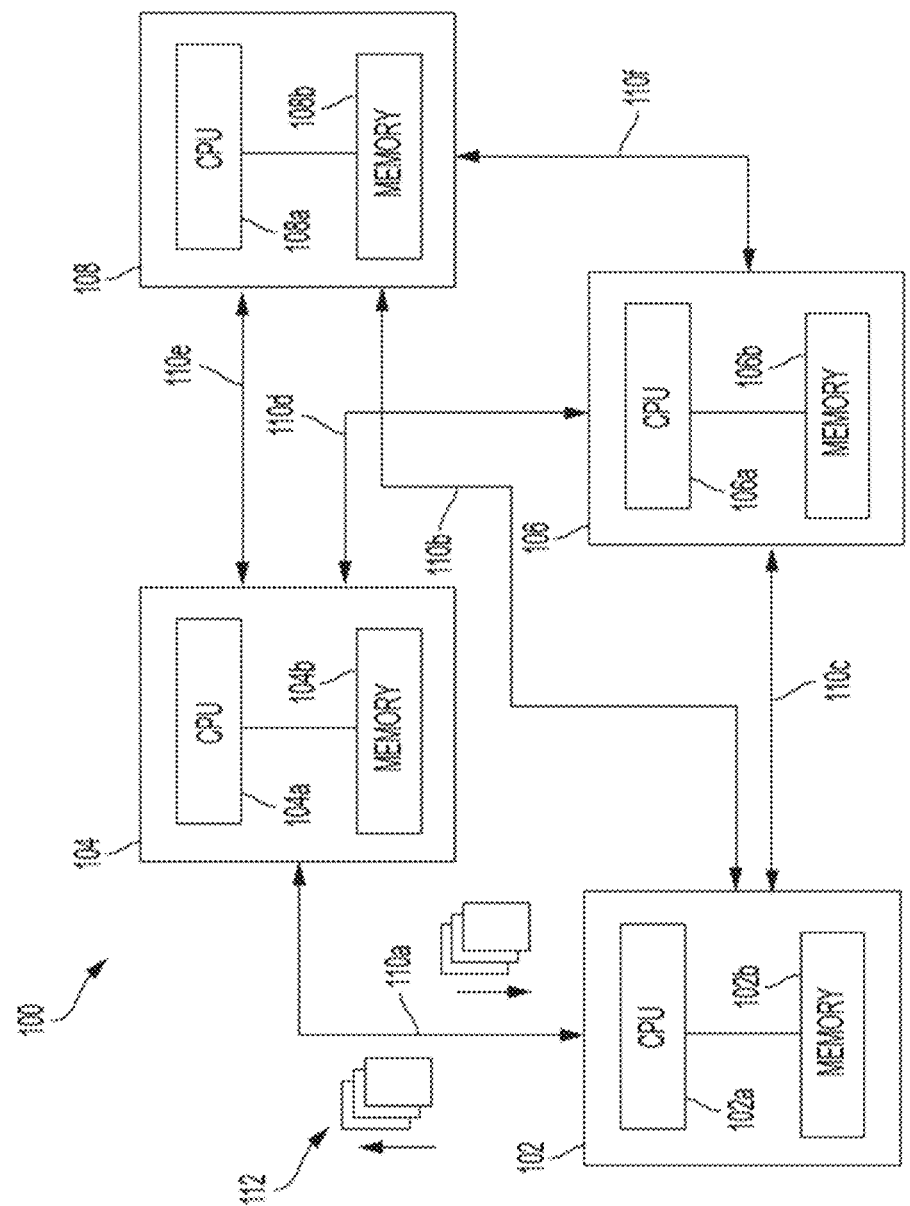
FIG. 1 illustrates an exemplary distributed computing system configured to execute a distributed software program according to examples of the disclosure.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a," "an," and "the" used in the following description are intended to include the plural forms as well unless the context clearly indicates otherwise. It is also to be understood that the term "and/or" as used herein refers to and encompasses all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follow are presented in terms of algorithms and symbolic representations of operations on data bits within a computer memory. These algorithmic descriptions and representations are the means used by those skilled in the data processing arts to convey the substance of their work most effectively to others skilled in the art. The algorithm here is generally conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

Certain aspects of the present Disclosure include process steps and instructions described herein in the form of an algorithm. It should be noted that the process steps and instructions of the present Disclosure could be embodied in software, firmware, or hardware, and, when embodied in software, they could be downloaded to reside on and be operated from different platforms used by a variety of operating systems.

The present Disclosure also relates to a device for performing the operations herein. This device may be specially constructed for the required purpose or it may comprise a general-purpose computer selectively activated or reconfigured by a computer program stored in the computer. Such a computer program may be stored in a non-transitory, computer-readable storage medium such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application-specific integrated circuits (ASICs), or any type of media suitable for storing electronic instructions and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present Disclosure is not described with reference to any particular programming language. It will be appreciated that a variety of programming languages may be used to implement the teachings of the present disclosure as described herein.

FIG. 1 illustrates an exemplary distributed computing system configured to execute a distributed software program according to examples of the disclosure. The example of FIG. 1 illustrates a distributed computing system 100 that includes a plurality of computing elements 102, 104, 106, and 108. Each of the computing elements 102, 104, 106, and 108 can include both a processor 102a, 104a, 106a, and 108a and a memory 102b, 104b, 106b, and 108b respectively. The processor and memory of each computing element can be utilized to execute a distributed software program in which portions of the overall program are executed individually by each computing element. The computing elements can coordinate their various actions by passing messages to one another that indicate the status of variables or other information needed by a component to carry out its portion of the distributed program. These messages can be referred to as "log streams" or "log files." In one or more examples, the "messages" can also include data about the operation of the system. For instance in one or more examples, the messages could include key value pairs such as IP addresses (i.e., the sender and receiver of a message's IP addresses.) The present disclosure thus may use the term log stream and log file interchangeably. In one or more examples, each component of the system 100 (i.e., 102, 104, 106, 108) can generate log streams 112 which can then be stored in a memory (not pictured) thus creating a log file that stores the contents of the log stream.

In one or more examples, each computing element 102, 104, 106, and 108 can be communicatively coupled to one another via communication channels 110a-f. In one or more examples, communications through communications channel 110a-f can be implemented using Wi-Fi, Bluetooth, Ethernet, or any other type of communications channel known in the art to connect two or more computing devices. In one or more examples, each computing element can be connected to every other computing element that is part of the distributed system. Alternatively, each computing element may be connected to only a subset of the computing elements that form the distributed computing system.

In one or more examples, the system 100 described above can also be implemented using a "bus" communications system. In one or more examples, in a "bus" communications system, each of the components of the distributed system, rather than directly messaging another component in the system, can alternatively send a broadcast message on a bus (i.e., a communication network shared by all of the components in the system) to every component in the system. In one or more examples, the components can parse the messages received over the bus to determine whether or not the received message is intended for it. In one or examples, the bus system can be used to not only pass messages between one or more components in the distributed system, but can also be used to broadcast messages to all of the components in the distributed system simultaneously.

Figure 2:
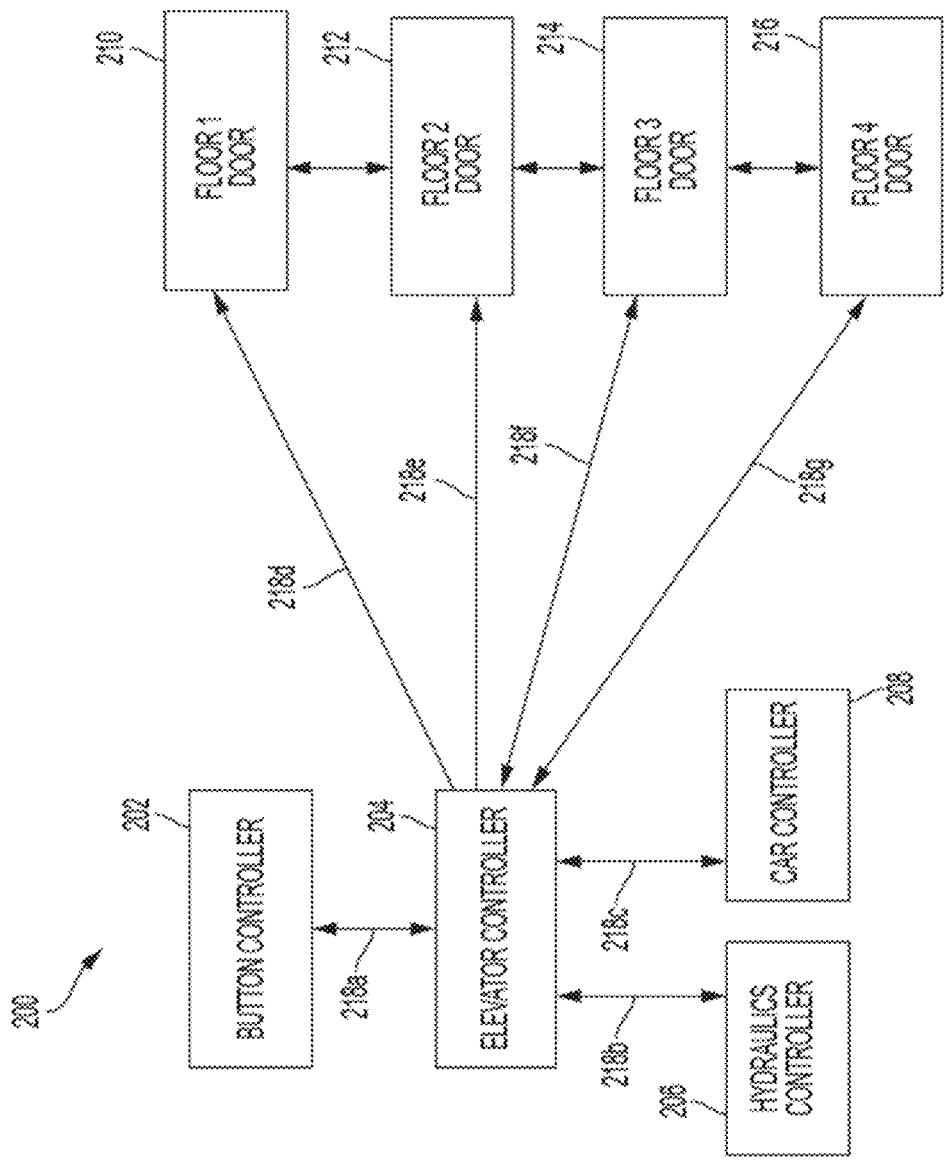
FIG. 2 illustrates an exemplary cyber-physical system that can utilize a distributed computing architecture according to examples of the disclosure.

Distributed computing systems can be utilized to coordinate the activities of multiple computing elements to execute a common task. For instance, a cyber-physical system can be implemented using a distributed computing environment. Cyber-physical systems can refer to systems that include physical entities and mechanisms that are controlled and monitored by computer-based processes. FIG. 2 illustrates an exemplary cyber-physical system that can utilize a distributed computing architecture according to examples of the disclosure. The system 200 described with respect to FIG. 2 can be implemented in an elevator system that transports people and/or objects from one floor of a building to another floor of a building. The system 200 can include a plurality of components 202, 204, 206, 208, 210, 212, and 214 that can be used by the elevator system to facilitate the transport of individuals from one floor of a building to another.

Button controller 202 can represent the processor and memory associated with the buttons of the elevator that are manipulated by a user of the elevator to control which floor/floors the elevator goes to. Elevator controller 204 can represent the processor and memory that can act as the central computing element of the system 200 that can coordinate the activities of each of the other elements attached to it. For instance, elevator controller 204 can be communicatively coupled to hydraulics controller 206 that coordinates the hydraulic components of the elevator system, the car controller 208 that controls the elevator car, and door processors 210, 212, 214, and 216, which control the individual doors of each floor of the building (in this example, the building has four floors).

Similar to the system described with respect to FIG. 1, the individual components of the system 200 can coordinate their activities with respect to executing a distributed software program by passing messages to one another via communications channels 218a-g. The distributed software program being executed by the system 200 can be configured to allow each of the individual components of the system to work together to execute on the common goal of facilitation the operation of the elevator for ordinary use.

The system 200 can act as an example of a cyber-physical system that utilizes a distributed computing architecture. A failure or effect may happen on the cyber-physical system 200 due to a cyber-attack, a natural cause, or human error. Such effects could occur either during operational use, or during its testing, prior to its production, or during its maintenance. It is possible to detect such effects when these effects manifest as messages or logs that are transmitted among the nodes of the cyber-physical system 200, which could be constituted as a distributed system 100.

In order to detect effects in a cyber-physical system, a streaming analytics system can use the message logs generated by the various components of the cyber-physical system to identify issues within the system. Since oftentimes, in the context of a distributed software program, a user may not have access to the entirety of the code (as it is often stored in the individual memories of the components of the system), the user can use the messages passed between the components to detect effects. In one or more examples, and as described below, the user can specify one or more watch points, to search for various patterns with the messages that may be indicative of a condition that the user is looking for. Thus, with respect to watch points, if the user wants to determine if and when any specified condition occurs during the execution of a distributed software program, they may want to quickly and efficiently scan the generated message logs to search for specific conditions.

Thus, when a user is specifying a watch point, in essence, they are instructing the system to parse through the various message logs to search for logs in which the condition specified by the user is true. In order to execute such a search, in one or more examples, the system can initiate a pattern search through the plurality of message s generated during the execution of the distributed software program.

A simple example can illustrate the above concept. If a distributed system only generated four types of messages [m1, m2, m3, and m4] and a user wanted to identify all instances in which m1 came before m2 in any given log, then the user would need to review every single log record (which could be in the tens of thousands or millions) and search for instances in the log records in which m1 appears before m2. Such a process could be extremely labor intensive and tenuous and therefore likely not feasible to implement.

As creating watch points can be characterized as an exercise in recognizing specific patterns within text, the systems and methods described herein can utilize specific tools that have been developed for discovering patterns within large volumes of text, such as message logs generated during execution of distributed software program. Such tools, often referred to as string search algorithms or string matching algorithms, can quickly and efficiently analyze large volumes of texts to search for distinct patterns that can be specified by a user. String search algorithms can use a precise syntax to express the precise pattern to be searched within the body of text.

String search algorithms are generally configured to maximize the efficiency of a computing device to search through large volumes of text to search for distinct patterns within the text. A string search algorithm that does not take into account the processing capabilities and methodologies employed by computers can mean that the string search algorithm may not yield a computationally efficient process that can parse through a set of text quickly. In the context of the present disclosure not only can the string search algorithm be configured to allow for quick processing of texts, but it can also be user-friendly in that a user can use a simple syntax to allow the user to quickly and easily set up a watch point.

Regular expressions are an example of a type of string search algorithm available to search for and identify specific patterns within a large body of text. Regular expressions are a sequence of characters that can define a specific pattern to search for in text. Regular expressions are often times employed in web search engines, word processors, and programming languages to search for specific patterns. Specifically, a regular expression is a string of symbols (also referred to as correlation names or correlation variables) representing the pattern to be matched. A regular expression can be built using one or more symbols to represent characters in the search and one or more operators that specify the type of pattern to search for. Examples of operators include a concatenation operator (e.g., an "AND" operator between symbols in a regular expression may be used to indicate an AND relationship between the symbols), alternation operator (e.g., a vertical bar '|' may separate symbols in a regular expression indicating an OR condition for the symbols), quantifiers, and grouping operators (e.g., indicated by parentheses). Examples of quantifiers include an asterisk '*' that can indicate one or more occurrences of the symbol with which the quantifier is associated, a plus sign '+' that can indicate occurrences of the symbol with which the quantifier is associated, and a question mark '?' that can indicate zero or one occurrences of the symbol with which the quantifier is associated, reluctant quantifiers, as examples.

While regular expressions have proven to be a particularly useful way of specifying patterns to be search within text, it is not specified in a user-friendly manner. Regular expressions often employ convoluted and esoteric symbols and characters that are not easily understood and require a great deal of knowledge to employ. Thus, requiring that a user create a watch point by specifying a regular expression may make it more likely that the user is unable to generate a watch point or will generate a watch point riddled with syntax errors, thereby making the watch point unable to be implemented.

To illustrate the nature of regular expressions, an example is provided below. Assume that a definition file for a distributed software program includes messages m1, m2, m3, and m4. If a user, using regular expressions, desired to search a body of log messages to determine instances in which m1 occurs before m2, the regular expression for such a pattern may look like the following:

(m1\[([^,\]]+),([^,\]]+)([^,\]]+)])((?>m1|m3|m4|)\[([^,\]]+)([^,\]]+)([^,\]]+)])*?(m2\[v([^,\]]+)([^,\]]+)\])

While the above regular expression is formatted and specified in a manner that can make the processing of such request faster and more computationally efficient, requiring a user to enter such an esoteric and complex search declaration will likely lead to a poor user experience and the inability to efficiently and effectively establish watch points.

Thus, in order to allow a user to specify their search criteria in a more user-friendly and simplistic manner, an "intermediate" or domain-specific language can be used that allows a user to specify a search in a simplistic manner. The user's specification can then be converted into a regular expression, which can then be executed on a plurality of message logs to identify patterns that match the user's specification.

An example domain-specific/intermediate language is described below. For purposes of the discussion, the example provided below can be called Happened-Before Language (HBL) and can represent a domain specific language that can be employed by a user to specify watch points. The HBL language can be used to analyze log records. To illustrate the functionality of the HBL language, assume a distributed software program in which there are only four types of message types: m1, m2, m3, and m4. Also assume that each message type m1, m2, m3, and m4 can be sent to and from components with the example distributed system labeled c1, c2, c3, and c4. Thus, in an example, a log string and expression such as m1[c1,c3] in the HBL language can represent message type m1 being sent from component c1 to component c3.

Given the specification of HBL described above, a log string can appear as follows:
m1[c1,c3] m1[c1,c2.c3] m1[c2,c1] m1[c3,*] m4[*,c3] m3[c1,c3] m1[c1,c2] m1[c1,c3]
m1[c1,c3] m2[c2,c1] m1[c3,*] m4[*,c3] m2[c3,c2] m3[c1,c3]

The above string shows various message types (m1-m4) being sent by various components (c1-c4). The HBL can be configured to allow the user to search for various patterns within a set of logs. For instance, a user could enter the following command: m1→m2. The above command can specify that the user is seeking to find all instances in which m1[*,*] happens before m2[*,*]. In other words, m2 must occur and m1 must occur, though in between, any message types other than m2 can occur. If the above HBL specification is executed on the log string provided in the example above, two results (i.e., hits) can occur as indicated below:
1. m1[c1,c3] m1[c1,c2.c3] m1[c2,c1] m1[c3,*] m4[*,c3] m3[c1,c3] m1[c1,c2] m1[c1,c3] m1[c1,c3] m2[c2,c1]
2. m1[c3,*] m4[*,c3] m2[c3,c2]

The above hits indicate patterns in the log string in which m1 appears before m2. The user can not only search for patterns based on message type but can also search for message types sent to or from a specific component within the distributed programming system. For instance, the user can specify the following command using HBL: m1[c3,*]→m2. This command can indicate that the user wishes to search for all instances in a log string in which m1[c3,*] happens before m2[*,*]. In other words, rather than just searching for instances in which message type m1 happens before m2, the search is more specific and is seeking instances in which message type m1 is transmitted from c3 before message type m2 occurs. Using the above log string, such a query can yield the following hits:
1. m1[c3,*] m4[*,c3] m3[c1,c3] m1[c1,c2] m1[c1,c3] m1[c1,c3] m2[c2,c1]
2. m1[c3,*] m4[*,c3] m2[c3,c2]

In one or more examples, the user using HBL can specify specific chronological patterns of message types. In other words, rather than just specifying patterns in which m1 occurs before m2, a user can specify to what degree m1 should come before m2. For example, if a user specifies the following HBL command: m1→[2] m2, then the system can search for all instances in a specified log string in which m1[*,*] happens exactly two messages before m2[*,*]. In other words, m2 must occur, and any two message types can occur, and then m1 must occur. Using the log string example above, the following hit can be produced:
1. m1[c1,c2] m1[c1,c3] m1[c1,c3] m2[c2,c1]

In another example, the HBL language can also be configured to allow the user to specify negative conditions. For instance, a user can set up a watch point by issuing the following command: m1→!m2. This command can indicate that the user wishes to search for all instances in a log string in which m1[*,*] happens before m1, m3, or m4. Alternatively stated, m1, m3, or m4, but not m2, occurs after m1. A substring of the log string that starts with m1 and ends with anything but m2 is a match. This substring will not include the ending message type of "anything but m2." Note that there could be more than two message types in matches. Using the log string example from above, the above command can produce the following hits:
1. m1[c1,c3] m1[c1,c2.c3]
2. m1[c1,c2] m1[c1,c3]
3. m1[c3,*] m4[*,c3]

In one or more examples, the HBL language can employ variable expressions. In one or more examples, variable expressions can be constructed with variables using the following operators: NOT (!), AND (&&), OR (||), ==, <, >. Therefore, a variable expression is an assertion that can evaluate to a Boolean value. In one or more examples, a variable expression can be used to identify events in which a variable is of a certain value or range of values. Variable expressions can be evaluated on every log record, or in one or more examples can be evaluated in log records containing certain types of messages. For example, a variable expression that is combined with a → expression, can indicated that the variable expression is only to be evaluated on specific messages corresponding to a matched substring, and may not be evaluated on other logs. More specifically, when combined with a → relationship, a variable expression may be evaluated based on the semantics of as shown below.

m1→((c1.var1==5) && (m2.var3>32.2)) asserts that the variable expression will evaluate to true at some time after m1 occurs.

m1→m2 ((c1.var1==5) && (var3>32.2)) asserts that the variable expression will evaluate to true at some time after m1 occurs. Note that "var3" is unqualified, and therefore is interpreted as "m2.var3" using the "m2" outside of the parenthesis.

m1→[0] ((c1.var1==5) && (m2.var3>32.2)) asserts that the variable expression will evaluate to true immediately after m1 occurs.

m1→[5] ((c1.var1==5) && (m2.var3>32.2)) asserts that in the sixth log message prior to when the expression ((c1.var1==5) && (m2.var3>32.2)) evaluates to true is of message type m1.

m1→[5] m2→[0] ((c1.var1==5) && (m2.var3>32.2)) asserts that the variable expression will evaluate true immediately after m2 that occurs 5 message types after m1.

The above examples are provided only for purposes of illustration and should not be construed as limiting. Furthermore, the above examples illustrate only a portion of the HBL's capabilities, and the HBL can be configured to allow a user to specify other types of patterns not discussed above.

Figure 3:
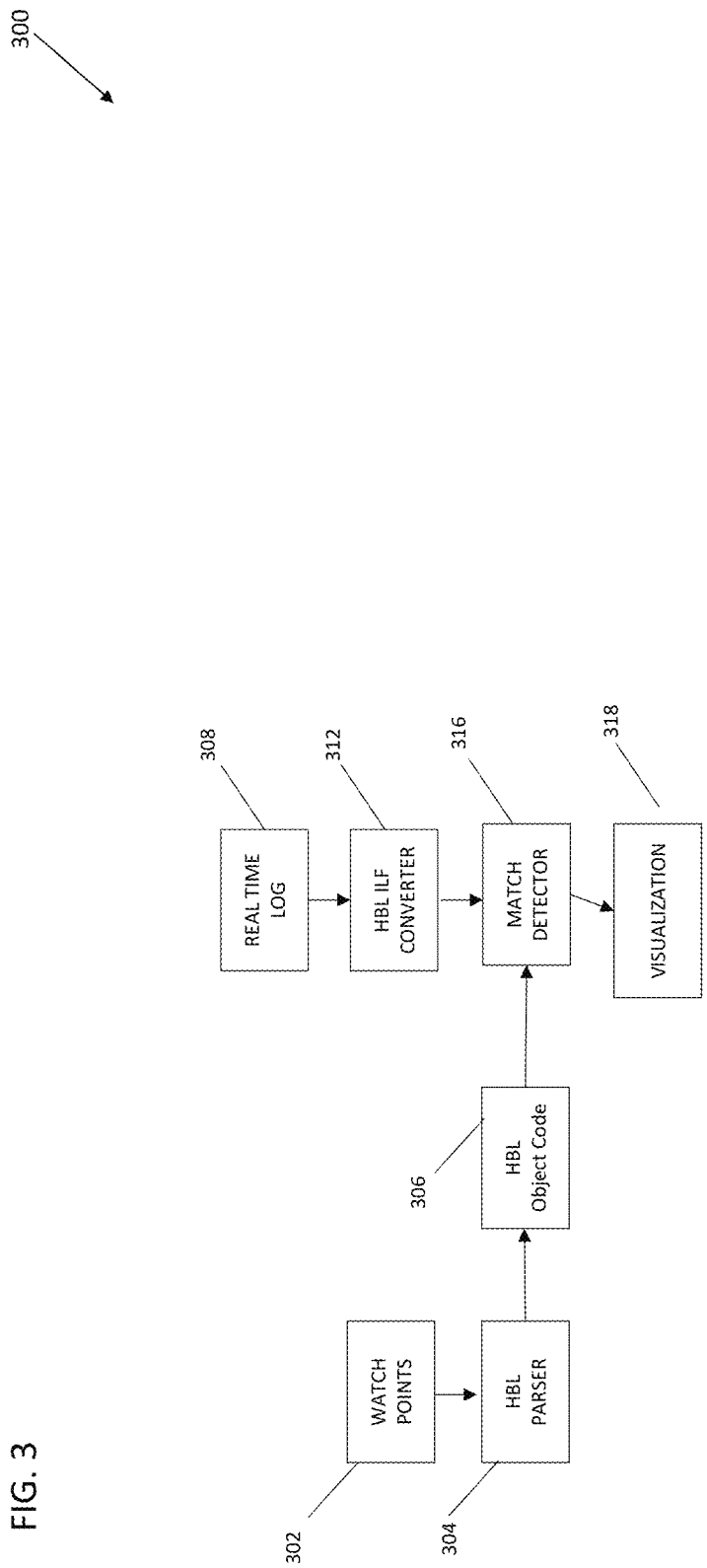
FIG. 3 illustrates an exemplary watch point creation system according to examples of the disclosure.

FIG. 3 illustrates an exemplary watch point creation system according to examples of the disclosure. The system 300 can include one or more watch points 302, which can be generated by a user using a domain-specific language, such as the example of HBL provided above. In one or more examples, the watch points 302 created by one or more users as described above can be stored in a memory (not pictured). In this way, the watch points can be made more easily available to other components of the system 300 for further processing.

The system 300 can also include a parser 304. In the example of the system 300, the parser 304 can be an HBL parser that is specifically configured to work with watch points that are declared by a user using the HBL language as described above. The parser 304 can parse each watch point 302 and determine if the watch point 302 contains one or more syntax errors. The parser 304 can also parse each watch point 302 to determine whether or not the watch point contains an incomplete specification, an inconsistent specification, or an incorrect specification. In other words, the parser 304 can parse each and every watch point 302 to determine if the watch point contains one or more errors that may prevent the system from identifying matching patterns in the log record.

If the parser 304 determines that such an error exists within one or more of the watch points 302, the parser 304 can generate an error message to the user indicating that one or more errors exist in the watch point.

Once the parser 304 has parsed each watch point 302 to detect any errors in how the watch point 302 was specified, the watch points 302 can be converted into HBL object code by a converter 306, which can then be applied to the log records. In one or more examples, HBL object code can comprise one or more regular expressions and variable expressions that can be collectively called the HBL Object Code. The converter 306 can employ one or more algorithms that effectively map HBL watch point into its corresponding HBL Object Code. Thus, the HBL Object Code embodies the instructions to detect the pattern with regex expressions and variable expressions. In one or more examples, The HBL Object Cod generated by the converter 406 can then be applied to the log records (as discussed below).

In parallel to the creation of the watch points 302, and their conversion to HBL Object Codes, the log records generated by execution of a distributed software program can be converted into an intermediate format in real time that can be searched by the HBL Object Codes. Thus, the system 400 can include real-time log generator 308. Real-time log generator 308 can generate log records during the real-time execution of a distributed software program as described above.

The real-time log records 308 can be converted into an intermediate log format (ILF) prior by ILF converter 312. In one or more examples, ILF can refer to any custom written mapping software that can convert a raw stream of data to a particular format. Thus, in one or more examples, the systems and methods described herein can be used to detect events in any raw data stream. Since HBL Object Code processing can depend on a standardized representation of log records, the ILF converter 312 can convert the log records provided by the element 308 into a format (i.e., HBL Intermediate Log format) that is easier and more efficiently searched using the HBL Object Codes generated by converter 306. A system may generate HBL ILF format compliant records or logs natively, or alternatively in one more examples the native generated logs can be translated to HBL ILF formatted logs.

The system 300 can also include a match detector 316. In one or more examples, the match detector 316 can take at its inputs the ILFs produced at element 312 and the HBL Object Codes generated by the converter 306. The match detector 316 can apply the HBL Object Codes to the ILFs and generate detection triggers and matching log records in the ILF. In one or more examples, match detector 316 can then transmit the matching log records from the ILF and the original real-time logs and stored logs generated by elements 308 to a match detector 416. The match detector 416 can use the matching log records from the ILF to find the matching log records in the real-time and stored logs.

Once the matching log records are found by the match detector 316, the identified matching logs can be transmitted to a visualization unit 318. Visualization unit 318 can translate the determined matches into visualizations that can be applied to a graphical user interface to provide alerts to a user/operator of the cyber-physical system that can the use the alerts to take actions to remedy any potential issues indicated by the alerts as discussed in further detail below.

Figure 4:
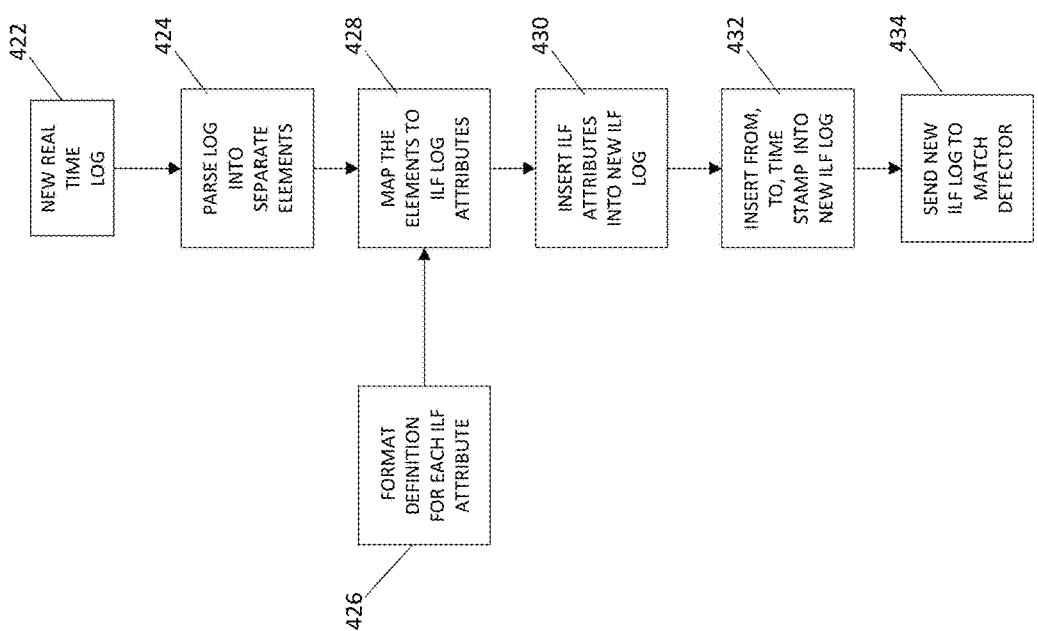
FIG. 4 illustrates an exemplary process for converting a log record to another log record conforming to the intermediate log format according to examples of the disclosure.

FIG. 4 illustrates an exemplary process for converting a log record to another log record conforming to the intermediate log format according to examples of the disclosure. This conversion process occurs in real-time, i.e., every log is converted into the intermediate log format as soon as the log is created. Note that a log is a copy of some message being sent from one component to another component in the cyber-physical system. In one or more examples, the process of converting a real-time log to an ILF format (i.e., converter 412 of system 400) can be achieved using the process 420 described below. In one or more examples, the process 420 of FIG. 4 can begin at step 422 wherein a log record, such as the log records discussed above with respect to 408 above can be received. In one or more examples, once the log record is received at step 422, the process 420 can move to step 424 wherein the log record is parsed into separate elements. In one or more examples, an "element" can refer to which system component the log event or record is being transmitted from, or to; the time stamp at which the said transmission occurred, or any of the values being transmitted.

In one or more examples, once the received log has been parsed into separate elements at step 424, the process 402 can move to step 42, wherein the elements defined at step 424 can be mapped to one or more ILF log attributes. In one or more examples, an ILF log attribute can refer to temperature values, commands, IP addresses, or other pieces of information that are sent from one component of a system to one or more components of system for the smooth operation of the system. In one or more examples, the format definition for each ILF attribute can be provided by a ILF attribute file imported at step 426 that can provide the definition for each attribute and that can be used to map the elements from step 424 to the attributes defined by the imported at step 426. In one or more examples, once the elements have been mapped to the ILF log attributes at step 428, the process 420 can move to step 430 wherein the ILF attributes defined and mapped to at step 428 are inserted into a new ILF log record (that is separated from the log record received at step 422). In one or more examples, once the new ILF log record is created at step 430, the process 420 can move to step 436 wherein identifying information about the attributes in the log record can be inserted included the sender and recipient of a particular message in the log record, as well as the time stamp of when the message occurred. In one or more examples, once the identifying information has been inserted at step 432, the process 420 can move to step 434 wherein the newly generated ILF log is sent to the match detector for further processing as described above with respect to FIG. 3.

In one or more examples, the watch points described above can be deployed on one or more streaming analytic engines (i.e., match detectors) that are configured to apply the generated watch points to the streaming log records to determine if one or more predetermined conditions (i.e., patterns) specified by the watch points are found in the log records received by the streaming analytic engine. In one or more examples, a streaming analytic engine can be configured to store and execute multiple watch points concurrently. Thus, in one or more examples, a streaming analytic watch point can have watch points created for it. In one or more examples a streaming analytic engine can have one or more watch points that are already deployed either modified or even deleted. In one or more examples, the watch points can be created, modified, or deleted by a local or remote client, and thus in one or more examples, the process of creating, modifying, and deleting watch points on a streaming analytic engine can achieved remotely.

Figure 5:
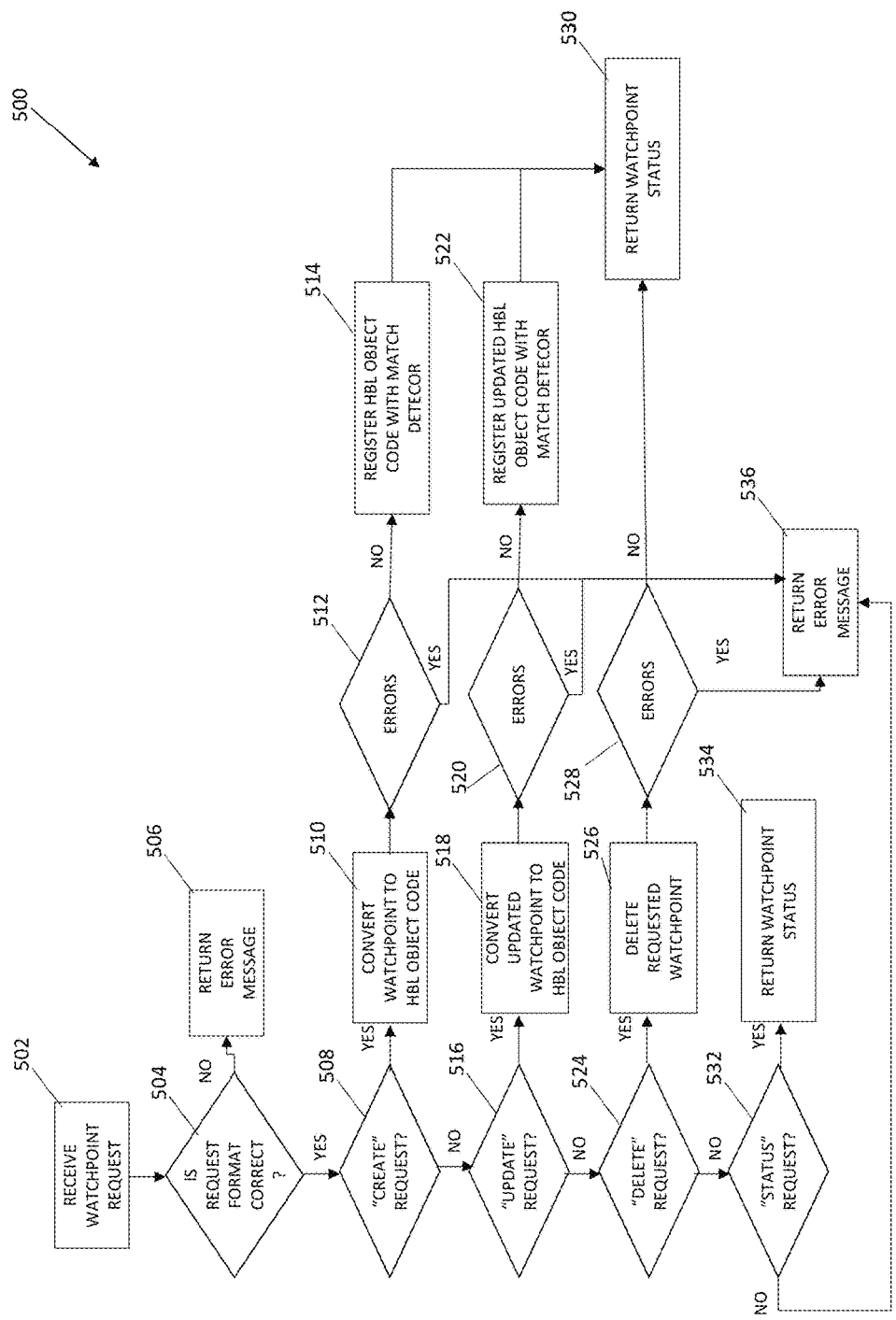
FIG. 5 illustrates the process for creating, updating, deleting, and getting status of watch points remotely according to examples of the disclosure.

FIG. 5 illustrates the process for creating, updating, deleting, and getting status of watch points remotely according to examples of the disclosure. In one or examples, the process 500 of FIG. 5 can be configured to allow for various watch points to created, modified, and deleted on a particular streaming analytic engine that is configured to monitor log records for the pre-determined patters or conditions specified by the watch points. In one or more examples, the process 500 can begin at step 502 wherein the watch point request is received. In one or more examples, a watch point request can be received from a local client or remote client via multiple transport protocols and services, such as HTTP using REST calls. In one or more examples, the watch point request received at step 502 can indicate a command or request to create a watch point, modify/update an existing watch point, or delete an existing watch point. In one or more examples, once the request is received at step 502, the process 500 can move to step 504 wherein a determination is made as to whether the request is in a proper formation. In one or more examples, if the request is found to be in an improper format at step 504, the process 500 can move step 506 wherein an error message is returned to the entity that generated the request received at step 502.

In one or more examples, if the request is found to be in a proper format at step 504, the process can move to step 508 wherein a determination is made as to whether the request received at step 502 is a "create" request that indicates the creation of a new watch point to be deployed on the streaming analytic engine. In one or more examples, if it is determined at step 508 that the request received at step 502 is a "create" request, then in one or more examples, the process 500 can move to step 510 wherein a watch point contained within the watch point request 502 is converted into an HBL object code (as described above). Once the object code is created at step 510, the process 500 can move to step 512 wherein the created HBL object is checked for errors. In one or more examples if an error is found at step 512, then the process can move to step 536 wherein an error message is returned to the entity that transmitted the watch point request at step 502. In one or more examples, if there are no errors found at step 512, then the process can move to step 514 wherein the HBL object code is registered with the match detector (i.e., the streaming analytic engine) and a message can be sent to the user at 530 indicating the status of the watch point (i.e., that it has been deployed) to the entity that transmitted the watch point request at step 502.

In one or more examples, if it is determined at step 508 that the request received at step 502 is not a create request, then in one or more examples, the process 500 can move to step 516 wherein a determination is made as to whether the request received at step 502 is an "update" request that is configured to update an already existing watch point that is currently deployed on the streaming analytic engine. In one or more examples, if the request received at step 502 is determined to be an update request at step 516, then the process 500 can move to step 518 wherein the update (i.e., the specification of a modified watch point) can be converted to an HBL object. Once the update has been converted to an HBL object at step 518, the process can move to step 520 wherein the newly created object code is checked for errors. If an error is determined at step 520, then the process 500 can move to step 536 wherein an error message is returned to the entity that transmitted the request at step 502. In one or more examples, if there are no errors found at step 520, then the process can move to step 522 wherein the HBL object code is registered with the match detector (i.e., the streaming analytic engine) and a message can be sent to the user at 530 indicating the status of the watch point (i.e., that it has been deployed) to the entity that transmitted the watch point request at step 502.

In one or more examples, if the request received at step 502 is determined to not be an update request at step 516, then the process 500 can move to step 524 wherein a determination is made as to whether the request is a delete request that is configured to delete a pre-existing watch point that is already deployed on the streaming analytic engine. In one or more examples, if it is determined that the request is a delete request at step 524, then the process can move to step 526 wherein the watch point that is requested to be deleted is deleted from the streaming analytic engine. In one or more examples, once the watch point has been deleted at step 526, the process 500 can move to step 528 wherein a check can be made to determine if there were any issues with deleting the watch point such that the watch point may still be deployed on the streaming analytic engine. In one or more examples, if an error is found at step 528, then the process can move step 536 wherein an error message is transmitted to the user generating the request received at step 502. If however, there are no errors found, then in one or more examples, the process 500 can move to step 530 wherein the status of the request is transmitted back to the entity that transmitted the request at step 502.

In one or more examples, if the request is determined to not be a delete request at step 524, then the process 500 can move to step 532 wherein a determination is made as to whether the request is a "status" request configured to request a status about a particular watch point that is deployed on the streaming analytic engine. In one or more examples, if the request received at step 502 is determined to be a status request, then the process 500 can move to step 534 wherein the watch point status is transmitted to the entity that transmitted the request received at step 502. In one or more examples, if it is determined that the request received at step 502 is not a status request at step 532, then the process 500 can move to step 536 wherein an error message is returned to the entity that generated the request received at step 502.

As described in detail below, the watch points and systems to monitor the conditions specified by a watch point can be used in various computing systems such as cyber-physical systems to facilitate operator responses to cyber-attack events in real-time that may not otherwise be addressable in an edge computing environment. In one or more examples of the disclosure, a cyber-physical system can be manifested as an edge computing system that is operated by a large entity or organization that may simultaneously own and operate multiple edge computing systems. Edge computing systems such as a cyber-physical system may require an operator to be positioned at the edge computing system to facilitate operation of the system given the complexity and operation needs of the system.

Figure 6:
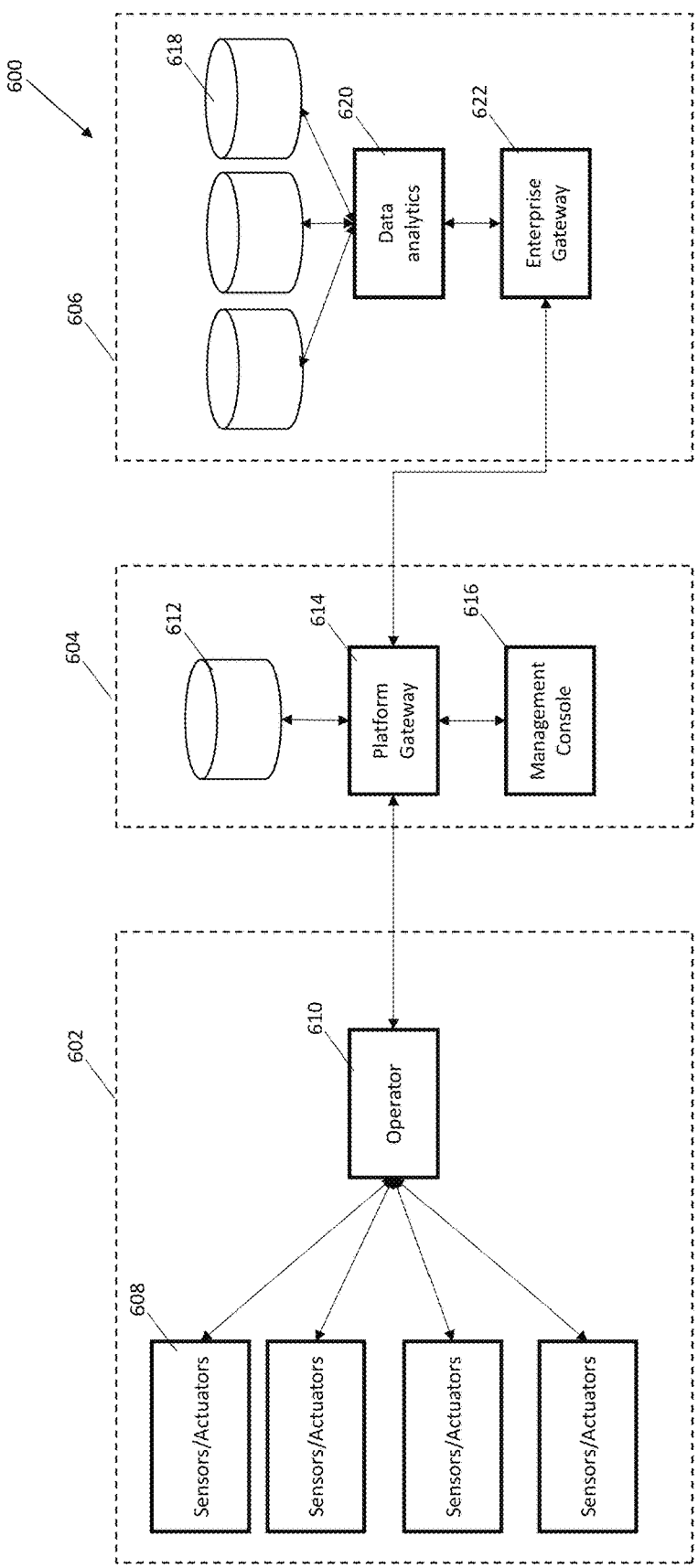
FIG. 6 illustrates an exemplary cyber-physical system interconnected with an exemplary platform and exemplary enterprise computing system, according to examples of the disclosure.

FIG. 6 illustrates an exemplary cyber-physical system according to examples of the disclosure. In one or more examples, system 600 of FIG. 6 can illustrate an exemplary enterprise computing system that includes a cyber-physical system located at an edge of the computing system. In one or more examples, system 600 can include an edge computing system 602 that includes one or more elements of the computing system that generate data and perform end user actions to operate the system 600. Thus, in the context of a cyber-physical system, an edge 602 can include one or more sensors and actuators 608. In one or more examples, the sensors can record data about the operation of the cyber-physical system, while the actuators of the edge 602 can perform physical actions in the cyber-physical system relating to the cyber-physical system. In one or more examples, the edge system 602 can include embedded controllers, sensors, actuators, communication networks, and some controlled physical process/systems associated with a cyber-physical system.

In one or more examples, the day-to-day and real-time operations of the edge computing system 602 can be managed by an operator 610. In one or more examples, the operator 610 can manage the edge computing system, by monitoring real-time data provided by the sensors and actuators 608 of the edge computing system. In one or more examples, the operator 610 by being physically located at the edge can respond to real-time operational conditions of the edge computing system 602. In one or more examples, the operator 610 can operate the edge computing system 602 using one or more computing devices that are connected to the sensors and the actuators 608, and that are collectively configured to allow for the operator to control the various aspects of the edge computing system.

In one or more examples, the system 600 of FIG. 6 can include one or more platforms 604. In one or more examples, the platform 604 can be configured to remotely operate a plurality of edges. Thus, in one or more examples, the platform 604 can operate multiple edge computing systems 602 remotely. For instance, a platform 604 can be configured to provide administrate control to multiple edges of the same type. For instance, if an enterprise owns multiple cyber-physical systems, then the platform 604 can be used to coordinate the operations or control the operations of the each edge computing system manifesting the cyber-physical system. In one or more examples, an enterprise may operate multiple different types of cyber-physical systems. Thus, in one or more examples, the enterprise computing system can include a separate platform 604 for each type of cyber-physical system or edge computing system in its network.

In one or more examples, the platform 604 can include one or more data repositories 612 that can store data regarding the various edge computing systems 602 that the platform 604 operates. In one or more examples, the platform 604 can include a platform gateway 614 that can act as the computing interface between an edge computing system 602 and the platform 604. Finally, the platform 604 can also include a management console 616 that can facilitate an administrator or other operator of the platform 604 to manage the one or more edge computing systems 602. While an operator 610 of the edge computing system 602 may perform the day-to-day operations of the edge computing system 602, a user of the platform 604 may exercise more systemic control of the edge computing system. For instance, in one or more examples, the user or administrator of the platform 604 can remotely operate any of the edges under the control of the platform 604. In one or more examples, remote operators using for instance can be similar local operators and have the similar permissions, except in one or more examples, they may have the ability to create, edit, and delete response lists (described in further detail below). In one or more examples, the operator of the platform can act as system maintainers that are tasked with maintaining edge computing environments that they are connected to. System maintainers, in one or more examples, may be limited privilege administrators that have read rights to information received by the operator 610 of the edge computing system, and have the ability to make limited changed, including updating response lists, unlocking user accounts, clearing stored alerts and learn data, and can add new local operator accounts and disable any existing accounts, except System Installer accounts.

In one or more examples, the system can include one or more enterprise computing systems 606. In one or more examples, the enterprise computing system can centrally operate each of the platforms 604 of the system 600. In one or more examples, the enterprise computing system 606, can also be known as the Information Technology (IT) layer of the system 600 and can contain various services and applications that maintain a workflow for the system 600. The platform layer 604 can thus act as the "glue" layer that connects the enterprise layer 606 with the edge layer 602. In one or more examples, the enterprise computing system/ layer can include one or more data repositories 618 that store data regarding the system, and a data analytics engine 620, that performs analysis regarding the data, and one or more enterprise gateways 622 that act as an interface between the enterprise computing system and the one or platforms 604.

In one or more examples, the enterprise computing system 606 can facilitate multiple roles within the enterprise computing system. For instance, in one or more examples, an operator operating the enterprise computing system 606 can act as a system installer for the edge computing systems 602 of the system 600. In one or more examples, the system installer can perform the initial system configuration. In one or more examples, this initial configuration can be used edge computing system 602 to allow or deny actions by any of the operators 610 and cannot be altered during edge computing operations, meaning that the actions that the system maintainer, local operator, or remote operator may be allowed to execute are configured initially during system configuration by system installer. In one or more examples, only the system installers may have the privileges required to add new system maintainers and/or remote operator accounts.

Alternatively or additionally, the enterprise computing system 606 can also be operated by a system administrator of the computing system 600. In one or more examples, the system administrator can be an actor who combines the role of both system installer and system maintainer. In one or more examples, this mixing of roles can occur on smaller systems with a limited number of users or for systems where a large degree of separation of duties may not required. In one or more examples, the system administrator can have all the powers of a system installer and a system maintainer and can reconfigure the system at will.

In the example system 600 of FIG. 6, the operator 610 of the edge computing system 602 may not be a cyber-security expert, and thus may not have the necessary knowledge to recognize and mitigate security incidents that may occur at the edge computing system. The operators of the platform 604 or the enterprise computing systems 606 may have the requisite knowledge to recognize and deal with cyber-attacks, but because they are remotely located and not operating the system in real time, their expertise and knowledge may not be immediately available as incidents arise as they would be if they were located on-site at the edge computing system 602. Thus, in one or more examples, a system that can not only apprise the operator in near real-time to cyber security events, but also provide the operator with an easy to follow set of steps to take in response to the determined cyber-security event can help to ensure that threat detection in mitigation resources are posted to the edge of the computing system so that threats can be dealt with in real-time, without requiring cyber-security experts to be posted to the edge computing environments.

Figure 7:
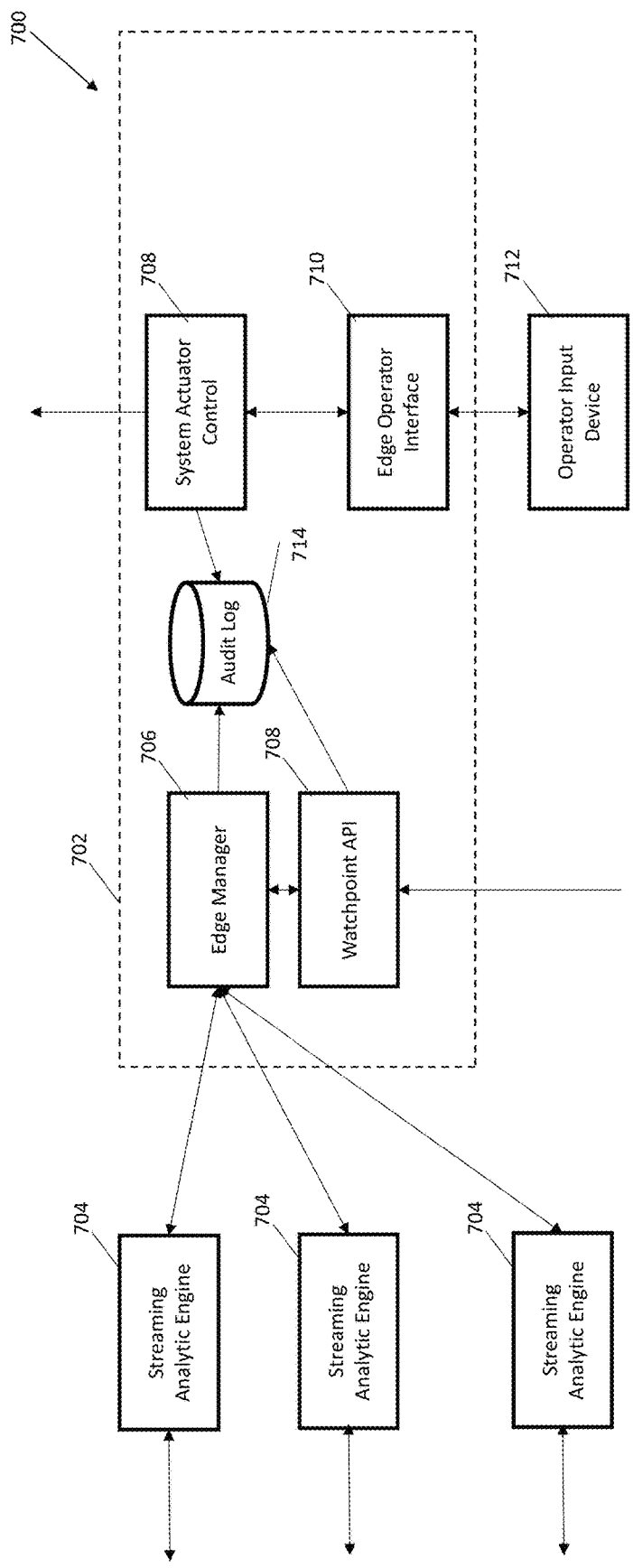
FIG. 7 illustrates an exemplary edge computing operations system according to examples of the disclosure.

FIG. 7 illustrates an exemplary edge computing operations system according to examples of the disclosure. In one or more examples, the system 700 can be positioned at the edge computing system such as the exemplary edge computing system 602 and provide the operator with an interface that can allow for them to not only detect cyber-security threats as they occur in near-real time, but can also provide the operator with a set of responses that are tailored to the type of threat detected at the edge computing system. In one or more examples, the system 700 can include an edge computing system monitor 702 that can be configured to facilitate detection of potential cyber-security events, and provide the operator with a list of responses which can be executed by the operator to either mitigate the threat or learn more about it. As described in detail below, the edge computing system monitor can use HBL defined watch points to detect potential security threats to the edge computing system, and can present the operator with one or more response lists based on the specific watch point condition detected in the cyber-physical system. Additionally or alternatively, the edge computing system monitor 702 can directly take action by controlling the edge computing system (for instance by operation one or more actuators of the cyber-physical system) to mitigate the threat posed by a potential cyber security threat.

In one or more examples, edge computing system monitor 702 can include an edge manager 706 that is configured to receive one or more HBL defined watch points, and apply the watch points to one or more data streams received by the edge computing system to detect conditions in the data stream that may signal a potential threat to the edge computing system. In one or more examples, the edge manager 706 can receive HBL defined watch points from a variety of sources. For instance, in one or more examples, the edge manager 706 can receive watch points from an external source (i.e., external to the edge computing system) for instance from a platform operator or an enterprise computing system operator (i.e., from a system installer or administrator). Alternatively, or additionally, the edge manager 706 can receive internally defined watch points from the operator (via edge operator interface 710 described in further detail below).

In one or more examples, the edge manager 706 can upload the HBL watch points, and then deploy HBL instances to one or more streaming analytic engines 704 that are configured to receive streaming data from the various sensors of the edge computing system. Thus, in one or more examples, edge manager 706 can be configured to receive HBL defined watch points, and then deploy the watch points to one or more streaming analytic engines 704. Each streaming analytic engine 704 can receive one or more data streams from various sensors or other components of the edge computing system (i.e., cyber-physical system) and apply the HBL defined watch points to the received data (which can be in ILF formatted log) to look to determine if the receive data matches one of the pre-determined patterns specified by the watch point. In one or more examples, if the data received at the streaming analytic engines 704 matches a condition specified by a deployed watch point, then the edge manager can transmit an alert to the user (for instance via the edge operator interface 710) indicating not only that an HBL condition has been found in the received data, but also providing information about the data that triggered the alert including the source of the data as well as a time-stamp of the data.

In one or more examples, the watch points handled by the edge manager 706 can be received from an external source via a watch point application program interface (API) 708. In one or more examples, the watch point API 708 can be configured to receive one or more HBL defined watch points in a pre-determined format from an external user, and can then convert the received watch point into a format that can be used by the edge manager 706 to deploy the watch points to one or more streaming analytic engines 704 so that the engines can parse received traffic to look for patterns in the received data that match the specified HBL watch points. In one or more examples, the watch point API 708 can also receive one or more response lists associated with the watch point. In one or more examples, a response list or response steps can provide the operator with a checklist that can be followed when an alert indicating a watch point criteria has been received. In one or more examples, the response list associated with a particular watch point can be received along with the watch point. In one or more examples, a response list can include monitoring and notifications actions, that require to not necessarily alter the operation of the cyber-physical or edge computing system, but instead monitor various sensors within the system, and/or notify other stakeholders of the system such as the system administrators associated with platform or enterprise computing systems that are communicatively coupled to the edge computing system. Additionally or alternatively, the steps provided in a response list can direct the operator to take one or more actions to modify the operation of the edge computing or cyber-physical system, such as by operation one or more actuators associated with the system or shutting down or disabling parts of the system. As discussed in detail below, when a response list is presented to the user in response to a watch point alert, the response list can include one or more user actionable buttons on the graphical user interface that allows the user to initiate the action indicated by the response list.

Additionally or alternatively, in one or more examples, the response list associated with the watch point can be created at the edge monitor itself. Thus, in one or more examples, a system maintainer or system installer/administrator can access the edge monitor 702 remotely and can create a response list that can be associated with the alert. By allowing for response list associated with a watch point to be specified with the watch point itself, or to be created after the fact by a system installer, the watch point and response list can be more secure because it may not be manipulated at the edge by a malicious user, since in one or more examples, a system administrator credential may be required to edit watch points and response lists. Furthermore, since the watch point and corresponding response list may require higher level of cyber-expertise than the typical operator of an edge computing station may have, allowing for the watch point and response list to be generated by an external operator, can facilitate allowing a system administrator with the requisite knowledge to create both the watch points and the response checklist that the operator can follow in the event that an alerted is generated from the watch point.

Figure 8:
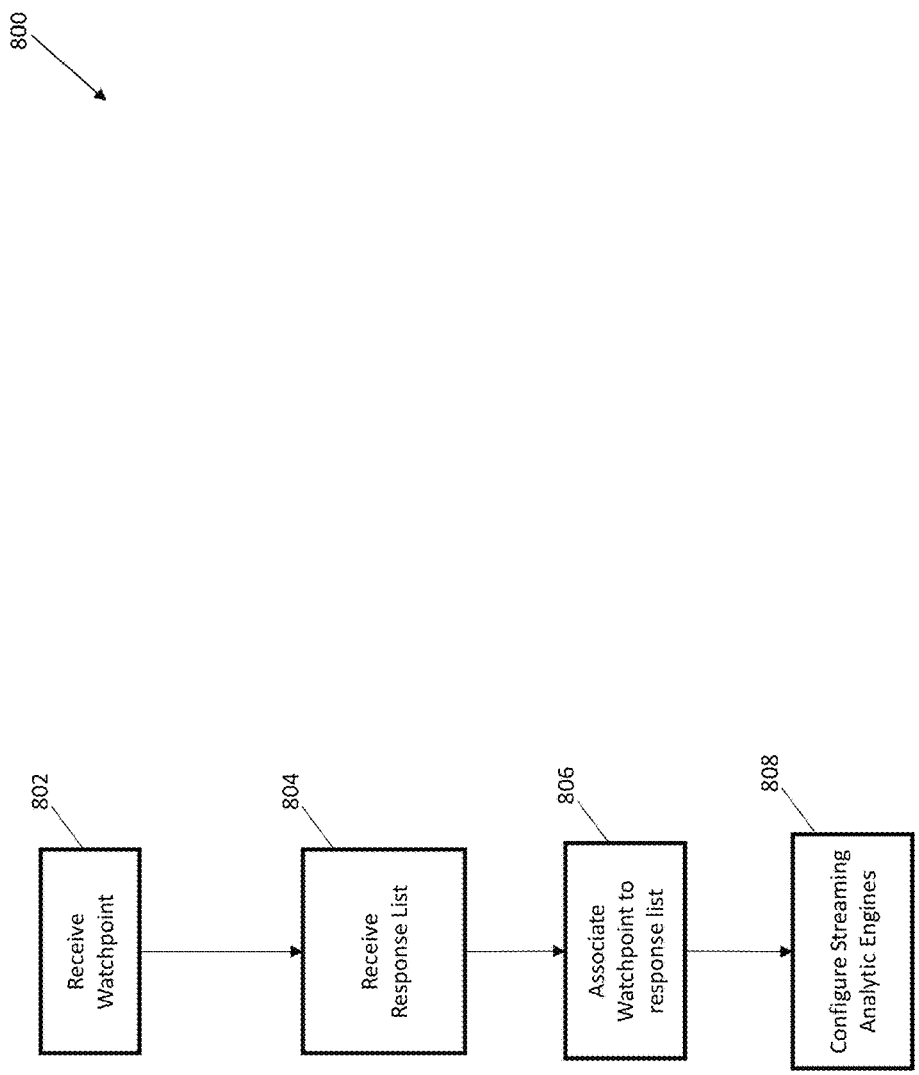
FIG. 8 illustrates an exemplary process for configuring an edge computing operations system according to examples of the disclosure.

FIG. 8 illustrates an exemplary process for creating a watch point alert according to one or more examples of the disclosure. In one or more examples, the process 800 of FIG. 8 can be performed by a combination of the watch point API 708 and edge manager 706. In one or more examples, the process 800 of FIG. 8 can begin at step 802 wherein a watch point is received. As discussed above, in one or more examples, a watch point can be received externally (for instance via watch point API 708) or internally from an operator or other user that is located at the edge computing site. Also as discussed above, the watch point can be specified using HBL and can be deployed to the one or more streaming analytic engines 704 of the edge monitor system 702. In one or more examples, simultaneously or after a watch point is received at step 802, the process 800 can perform step 804 wherein a response list is received. As discussed above, a response list can include the actions to take by a user in response to the alert.

In one or more examples, once a response list has been received at step 804, the process 800 can move to step 806 wherein the watch point and the response list are associated with one another. In one or more examples, associating the watch point with the response list can include configuring the system so that when an alert corresponding to a watch point alert is received, the corresponding response list will be automatically presented to the user. In one or more examples, if a watch point does not have a response list associated with it, then at step 804 a default response list (that instructs the operator to notify an administrator for example) can be generated, and then associated with the watch point at step 806 such that when the watch point alert is received, the default response list is presented to the user via a graphical user interface. Finally, once the response list has been associated with the watch point at step 806, the process 808 can proceed to step 808 wherein the watch point is deployed to the one or more streaming analytic engines of the system to thereby configure the engines to send alerts to the operator when a condition specified by the watch point is found within the data received by the analytic engines.

Returning to the example of FIG. 7, in one or more examples, the edge computing monitor 702 can include an edge operator interface 710. As described above, the edge operator interface 710 can be configured to facilitate an operator's interaction with the edge computing monitor 702. Thus, in one or more examples, the edge operator interface 702 can be configured to present the user/operator with one or more graphical user interfaces that can allow for the operator to receive alerts indicating that the streaming data transmitted in the edge computing system matches one or more of the conditions specified in the one or more HBL watch points and can present the user with one or more response lists that are associated with the watch point, so that the user can take appropriate actions on the edge computing system in response to the received alert. In one or more examples, the user can interact with the edge operator interface using an operator input device which can include a mouse, keyboard, touch screen, or any other device that is configured to allow for user to provide input to the edge operator interface 710. In one or more examples, and as described in further detail below, the edge operator interface 710 can be communicatively coupled to one or more system actuator controls 708. In this way, if a user provides an input at the edge operator interface indicating that one or more actions are to be taken on the system by operation one or more actuators of the system (in the examples of a cyber-physical system) then in one or more examples, the user's action can be facilitated by the system actuator control module 708.

In one or more examples, the system 700 and specifically the edge system monitor 702 can include an audit log 714. In one or more examples, the audit log 714 can be configured to record the activities and actions taken by the system. For instance, audit log can receive and track activity associated with received watch points and when/where they were deployed, what alerts were generated during operation the system, what response actions the user initiated, and other information associated with operation of the edge computing system. By keeping a log of the activity taking place at an edge computing system, a system operator or administrator can review the logs to diagnose or analyze various events occurring at the edge computing system.

The exemplary system 700 of FIG. 7 can be used to facilitate detection of cyber-events and their responses on an edge computing system by an operator who may not have the required experience or knowledge to diagnose and respond to cyber-incidents without any aid. Using the system 700 of FIG. 7 as a framework, the edge computing system can thus have a structured process by which alerts are received and dealt with that does not require the operator of the edge computing system to self-diagnose cyber-events on the edge computing system and self-mitigate those events by planning a response to the detected event. In one or more examples, the combination of the HBL defined watch points (which help to identify cyber-events) and the response lists associated with each watch point can provide the operator with the tools to provide near real-time cyber-threat detection and mitigation.

Figure 9:
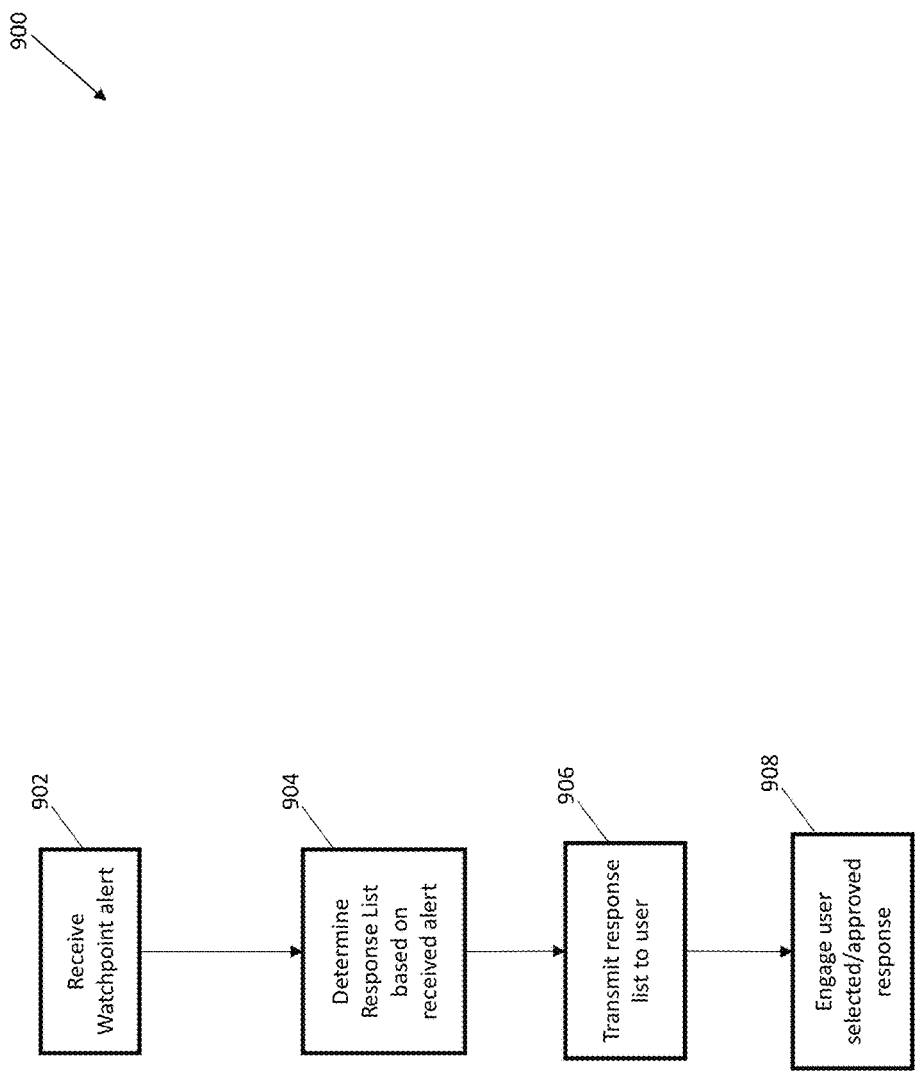
FIG. 9 illustrates an exemplary process for operating an edge computing operations system according to examples of the disclosure.

FIG. 9 illustrates an exemplary alert and response process for operating an edge computing system according to examples of the disclosure. In one or more examples, the process 900 of FIG. 9 can begin at step 902 wherein a watch point alert is received. As discussed above, one or more watch points can be loaded onto one or more streaming analytic engines associated with the edge computing system, and can be configured to generate alerts when a pattern or other conditioned defined by the watch point is found in the logs of data produced by the edge computing system. Additionally or alternatively, receiving a watch point alert at step 902 can also generally include any alert that a pre-defined condition has been found within the log data of the edge computing system. For instance in one or more examples, one or machine learning classifiers can be applied to the streaming data of the edge computing system, with each classifier being configured to determine the presence of one or more patterns within the data that may be indicative of a cyber-threat or other cyber-event of concern. In the instance of using machine learning classifiers, step 902 can include receiving an indication from one or more of the machine classifiers that a pre-determined condition or condition associated with a cyber-attack has been observed in the log records of streaming data associated with the edge computing system.

Figure 10:
FIG. 10 illustrates an exemplary watch point alert graphical user interface according to one or more examples of the disclosure.

In one or more examples, the user/operator of the edge computing system can receive a watch point alert in the form of a graphical user interface that is displayed to the user/operator. In one or more examples, and as described below, a watch point alert GUI can include one or more interactive features that allow for the operator to obtain detailed information about the alert including the components of the edge computing system associated with the alert, the frequency and timing of the alert, and other information about the alert that may be pertinent to the mitigation of the condition that caused the alert. FIG. 10 illustrates an exemplary watch point alert graphical user interface according to one or more examples of the disclosure. In one or more examples, the GUI 1000 of FIG. 10 can represent an exemplary GUI that can be presented to the operator of an edge computing system, and provides the operator with a view of all the alerts received by the system as well as pertinent information about the alert. Additionally, as described in further detail below, the GUI can also include interactive components that the user can interact with to get more information about the alerts or take other actions in response to the alerts.

In one or more examples, GUI 1000 can include a list of alerts as illustrated. Each alert with the same watch point name, event source (i.e., what component caused the alert), and event sensor (i.e., the sensor within the component that caused the alert) can be grouped together as an alert aggregate. Thus, in one or more examples, each row of GUI 1000 can represent a single alert aggregate, with each row of the GUI 1000 providing information about alert aggregate. In one or more examples, each alert aggregate row of GUI 1000 can include the watch point name 1002, which identifies the name of the watch point that triggered the alert. In one or more examples, the alert aggregate row of GUI 1000 can include a mitigation status indicator 1004 that can inform the user as to whether any responses have been performed in response to the alert aggregate, or whether new alerts within the aggregate have been detected since the last time the alert aggregate was responded to.

In one or more examples, an alert aggregate of GUI 1000 can include a risk rating indicator 1006 that can indicate an assigned risk level of the alert. In one or more examples, when a response list is generated for a particular watch point, a risk level associated with the watch point can be assigned. Thus, in one or more examples, the risk rating assigned to the watch point can be indicated by risk rating indicator 1006. In one or more examples, a user can mouse over the risk rating indicator 1006 to see a detailed description of the risk level. Thus, in one or more examples, while risk rating indicator 1006 can be a picture or thumbnail providing the operator with a visual indication of the risk associated an alert aggregate, the operator can also get textual information from the risk rating indicator 1006 through interaction with the visual display. In one or more examples, the GUI 1000 and specifically an alert aggregate can include an alert number indicator 1010 that indicates the number of alerts within the aggregate. In one or more examples, the alert number indicator 1010 can include the number of times the same watch point, component, and sensor (i.e., the components of the alert aggregate) produced an alert (i.e., the pattern indicated by the watch point was encountered in the component and sensor of the edge computing system. In one or more examples, the alert number indicator 1010 can be complimented by timestamp indicator 1008 that provides the time of when the first alert in the alert aggregate was received as well as the time that the latest alert in the alert aggregate was received.

In one or more examples, each alert aggregate can further include an interactive expand button 1012, which as described in further detail, when pressed by a user (i.e., through a mouse click) can provide more detailed information concerning the alert aggregate. In one or more examples, the expand button 1012, when pressed by an operator, can also provide a response list to the user, providing the user/operator with the pre-defined response steps to be performed in response to the alert. Returning to the example of FIG. 9, once a watch point alert has been received at step 902 (for instance using the GUI 1000 of FIG. 10), the process 900 can move to step 904 wherein a response list that had previously been associated with the watch point of the watch point alert is determined. In one or more examples, determining the response list at step 904 can include recalling the corresponding response list associated with the watch point from a memory in response to receiving an alert based on the watch point. In one or more examples, once the response list associated with a watch point alert is determined at step 906, the process 900 can move to step 900 can move to step 906 wherein the response list is transmitted to the user.

In one or more examples, transmitting the response list to the operator at step 906 can include transmitting a GUI to the user via an electronic display. In one or more examples, the response list can be aggregated with the alert GUI described above with respect to FIG. 10, such that the alert and the response are listed together. For instance, as described above, if a user expands an alert aggregate (for instance by pushing expand button 1012), then in addition to being provided with more information regarding the alert, the operator can also be provided with the response list associated with the watch point and determined at step 904 of process 900.

Figure 11:
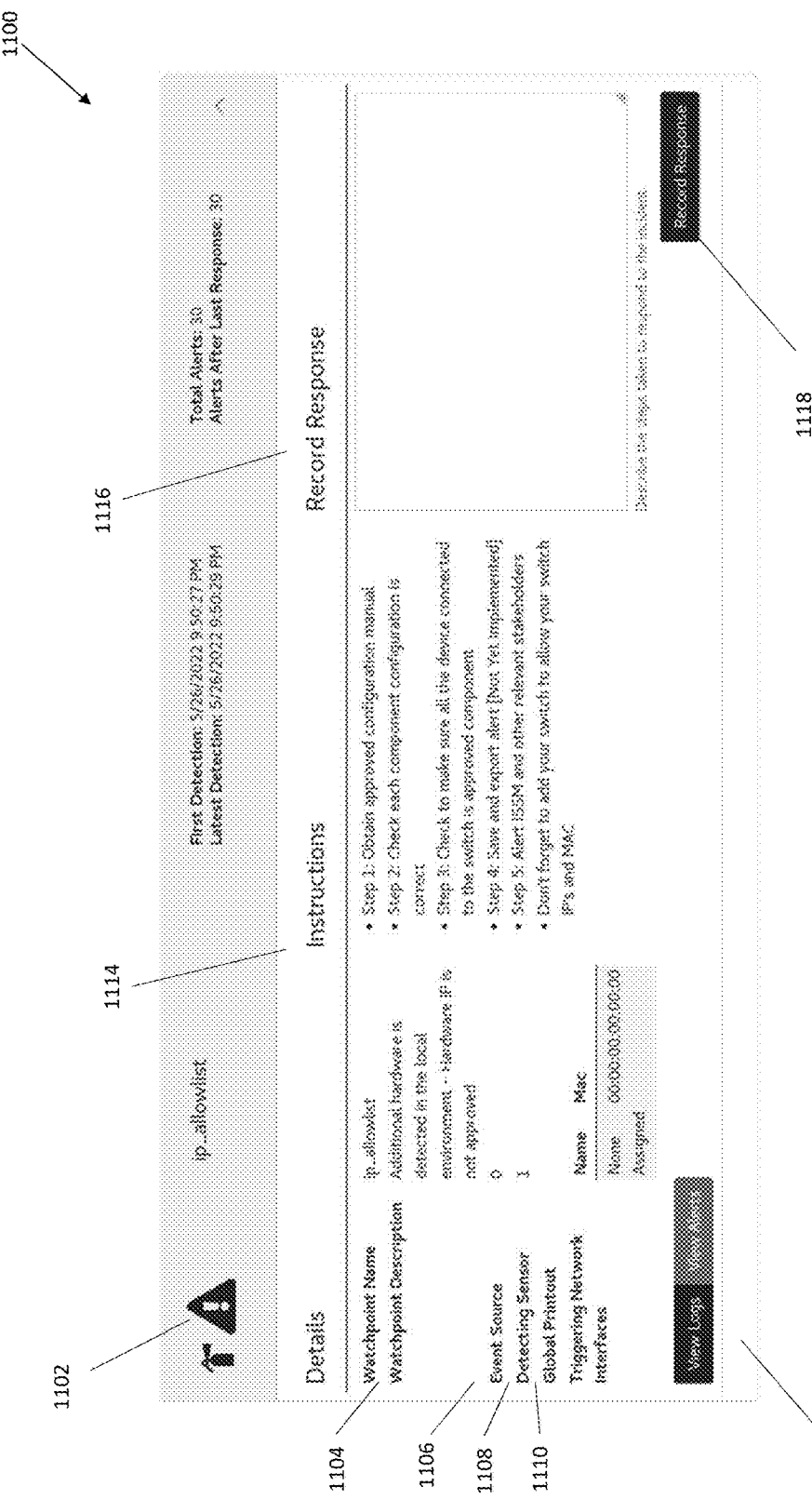
FIG. 11 illustrates an exemplary response list according to examples of the disclosure.

FIG. 11 illustrates an exemplary response list graphical user interface according to examples of the disclosure. In one or more examples, the GUI 1100 can be presented to a user/operator when button 1012 is selected by the operator at GUI 1000 as discussed above with respect to FIG. 10. In one or more examples, the response list GUI 1100 can include a banner 1102 which includes the same information about an alert aggregate previously described above with respect to GUI 1000 of FIG. 10. In one or more examples, the response list GUI 1100 can include more detailed information about the alert (that needs a response). For instance in one or more examples, the response list GUI 110 can include a details section that can include additional information about the alert aggregate. For instance, in one or more examples, the information can include an alert description 1104, which can include information about the alert beyond simply the name of the alert. In one or more examples, alert description 1104 can describe if any response steps have been written for the alert, or can include any other type of information about the alert such as the type of cyber-threat the alert is associated with, and the type of computing components of the edge computing system that are associated with the alert.

In one or more examples, the details can include an even source indicator 1106. In one or more examples, the event source indicator 1106 can include information about the component or components within the edge computing system where the alert originated from. As described above, watch points can search for pre-defined patterns found within logs of messages passed between components in a distributed computing system such as a cyber-physical/edge computing system. Thus, in one or more examples, the event source indicator 1106 can provide information to the operator about the particular component or components of the system from which the pre-determined pattern established by the watch point came from. In one or more examples, event source indicator can include information about the specific system whose logs triggered the alert. Similarly, in one or more examples, the details can include a detecting sensor indicator 1108 which provides details about a particular sensor within the source component that generated the alert. In one or more examples, and as described above, HBL instances can be deployed to one or more streaming analytic engines (see discussion above with respect to FIG. 7). Thus, sensor indicator 1108 can provide information about which specific HBL instance or streaming analytic engine generated the alert. In one or more examples, the details can include a global printout indicator 1110 which is a diagnostic field that is filled out by an HBL instance deployed on an analytic streaming engine that includes diagnostic information about the alert.

In one or more examples, the response list GUI 1100 can include one or more interactive buttons that can be clicked on by the operator, thus allowing the operator to interact with the alert and specifically to access more detailed information about the alert. For instance, in one or more examples, the GUI 1110 can include a "view logs" button 1112 that when clicked on by the user allows the user to view the specific log records that triggered the watch point alert.

In one or more examples, the response list GUI 1100 can include an instructions list 1114 that includes the list of responses that the operator is to take in response to the alert. For instance, and as shown in GUI 1100, the instructions list (i.e, the response list) can instruct the operator to check various settings and configurations associate with the edge computing system, and can also instruct the operator contact their system administrator to get a plan for responding to the alert, and then input the plan into the system so it can be recorded. Additionally or alternatively, in addition to notifying administrators or other parties about the alert, the instructions list 1114 can include actions that the operator can take on the edge computing system such as turning or modifying the operational state of various components of the computing system. In one or more examples, the GUI 1100 can include a recorded response input field 1116 in which a user/operator can record the response that was taken in response to the alert. In one or more examples, the user can clicked a record response button 1118 that can take the response typed into response input field 1116 and store it in a memory such as the audit log previously discussed above. In one or more examples, the GUI 1100 can include one or more interactive buttons that when clicked by the operator, can perform the response listed in the response list. For instance, in one or more examples, in response to clicking a button on the response list that instructs the user to deactivate a component of the edge computing system, the component indicated by the response list can be deactivated.

Returning to the example of FIG. 9, in one or more examples, once the response list has been transmitted to the operator at step 906, the process 900 can move to step 908 wherein any actions taken by the user in accordance with the response list can be executed. Thus, in one or more examples, if the user indicates via a GUI to deactivate one or more components, or otherwise change the operational state of the edge computing system in any manner, then in one or more examples, the operator's instructions can be carried out at step 908.

The systems and methods described above can allow for robust cyber-threat detection and mitigation without requiring the placement of highly-trained cyber-experts at the edge computing operations of an enterprise. Thus, in one or more examples, the systems and methods described above provide an operator of an edge computing system with the resources and tools to monitor the edge computing system for cyber-threats and perform system mitigations in near-real time (i.e, when the cyber even is occurring or has already occurred).

The system described above can be implemented to allow an operator of an edge computing system to not only receive alerts in real-time regarding cyber-events that are occurring on the system, but also provides the operator with the tools necessary. However, one consequence of a system that can provide the operator with real-time alerts, is that the operator over time and during operation of the edge computing system can suffer from "alert fatigue." Security Monitoring of Cyber-Physical Systems, such as manufacturing plants, medical devices, sewage plants, satellites, Internet of Things (IoT) devices, and vehicles, can often be a tedious process involving a multitude of alerts, sometimes in the millions. Each alert can require triage and investigation by a security analyst (as discussed above). Analysts/Operators can face an overwhelming number of alerts and struggle to commit the time needed to investigate them fully. Therefore, it can be beneficial to not only have accurate and robust alerting systems in place to detect threats, but to have alert fatigue reduction techniques implemented in security monitoring systems so that an operator does not become apathetic to alerts or become overwhelmed by the number of alerts.

In one or more examples, and as described above, a particular condition associated with a watch point can occur repetitively, meaning that multiple alerts can be generated for the same incident. In a system without methods/processes for reducing alert fatigue (by reducing the amount of alerts an operator must encounter and sift through), the operator may encounter a large number of often repetitive alerts. The large volume and repetitive nature of the alerts can lead to various negative consequences such as: (1) the alerts are ignored or missed by the operator, (2) true positive alerts (i.e., issues that are alerted that the operator may need to act on) are missed, (3) each alerts may take too long to analyze, and (4) the operators time and cognitive load is overly occupied with the alerts and the analysis required to clear alerts.

One technique which can help with alert fatigue is to reduce the overall number of alerts for a given watch point. For instance, in one or more examples, and as described in further detail below, the system and methods can allow only a certain number of alerts associated with a particular watch point to be broadcast or transmitted to the operator for their review, thereby minimizing alert repetition. In one or more examples, rather than determine whether an alert is a true positive (i.e., a condition that the operator needs to address) or a false positive, the system instead reduces the overall number of alerts by reducing the total number of alerts sent to the operator without regard for whether the alert is valuable to the operator or not.

Figure 12:
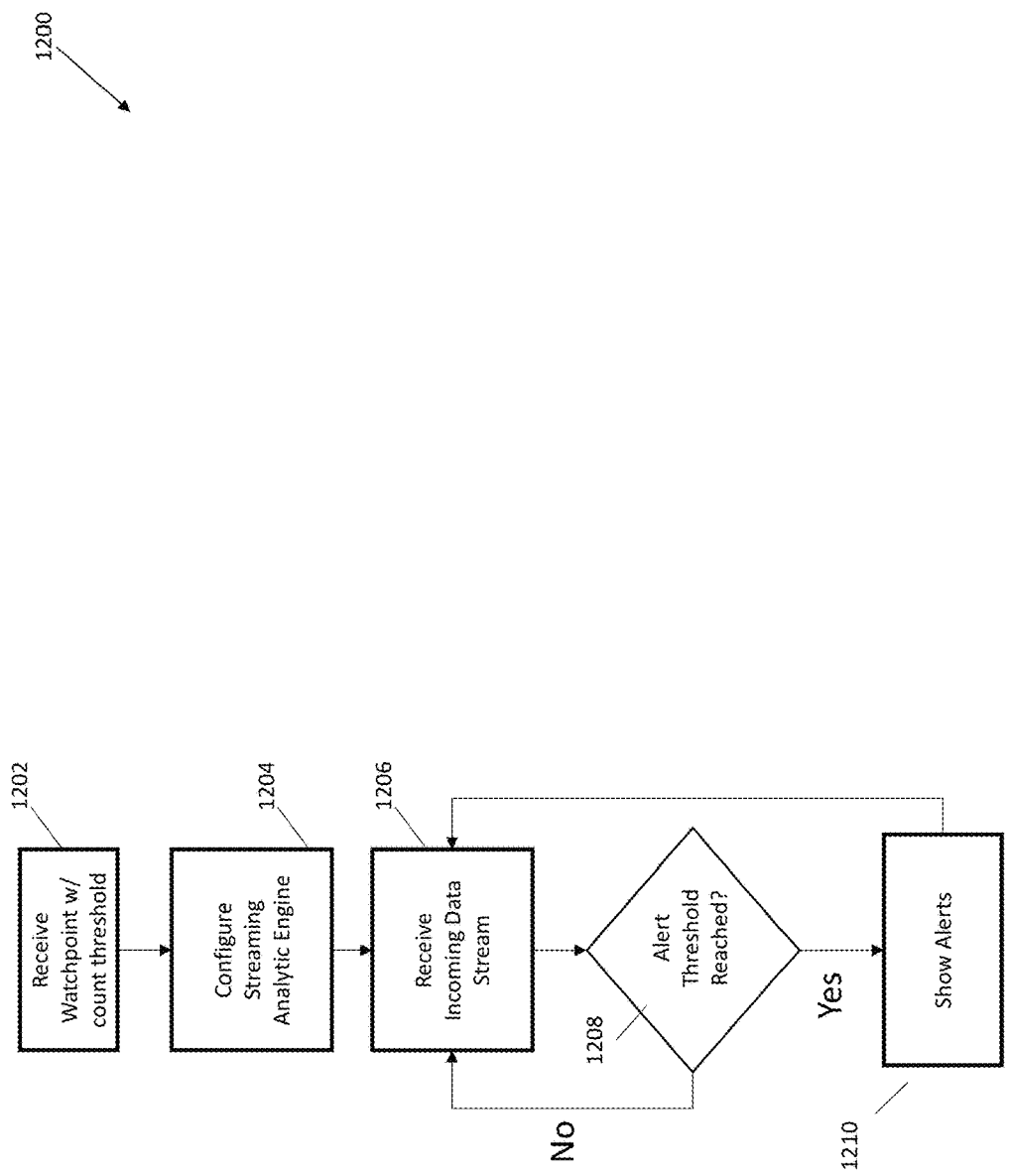
FIG. 12 illustrates an exemplary process for using alert count suppression to reduce alert fatigue according to examples of the disclosure.

FIG. 12 illustrates an exemplary process for using alert count suppression to reduce alert fatigue according to examples of the disclosure. In one or more examples, the process 1200 of FIG. 12 can be used to reduce the overall number of alerts received by an operator. In one or more examples, the process 1200 can begin at step 1202, wherein the system (i.e., the edge manager which is configured to manage the edge alerting system) can receive a watch point from a user of the system (i.e., an operator or authorized administrator). In one or more examples, the watch point can include a count threshold value, which sets a limit for the number of alerts that the watch point can generate when being applied to an incoming data stream. In one or more examples, the count threshold value specified with the watch point can represent a ceiling for the number of alerts that are permitted for that watch point. In one or more examples, when the alert count threshold is reached, the watch point will no longer generate further alerts on that data stream.

In one or more examples, once the watch point has been received at step 1202, the process 1200 can move to step 1204 wherein the received watch point is deployed to one or more streaming analytic engines so as to be applied to one or more data streams associated with the streaming analytic engine. In one or more examples, each deployment of a watch point (i.e., onto a streaming analytic engine) can each have its own count threshold such that when the data stream associated with the streaming analytic engine generates more alerts than the count threshold, the alerts for that streaming analytic engine and engendered by the watch point are suppressed. In one or more examples, once the watch point has been deployed to a streaming analytic engine so as to configure the streaming analytic engine at step 1204 the process can move to step 1206 wherein the streaming analytic engines where the watch point is deployed can receive their respective data streams. At step 1206, the data stream can be analyzed to determine if the conditions or patterns specified by the watch point are present within the streaming data. In one or more examples, as a condition that matches the watch point is found, an alert can be sent to the user. Thus, in one or more examples, when an alert is triggered by the watch point during the analysis of the streaming data at step 1206, the process 1200 can move to step 1208, wherein a determination is made as to whether the number of alerts (i.e, the count threshold) associated with the watch point has been reached. In one or more examples, if the number of alerts associated with the watch point for the data stream has not been reached, then the process reverts back to step 1206 wherein the data stream is further analyzed, and more alerts are generated when the condition associated with the watch point is encountered in the streaming data.

In one or more examples, if the threshold has been determined to have been reached at step 1208, then the process 1200 can move to step 1210 wherein the alert is shown to the user. In one or more examples, the process 1200 can be configured to suppress alerts from the user until they reach above a certain threshold, and only then will they be shown to the suer. In one or more examples, suppressing an alert can refer to not transmitting the alert to the operator of the edge computing system so that they don't receive the alert as part of the alerts they are being supplied by the various streaming analytic engines. In one or more examples, once an alert is shown to the user (i.e., no longer suppressed) due to the count threshold being exceeded at step 1210, then the process can revert to step 1206 wherein the data stream is further received and analyzed as described above.

In one or more examples, an operator may require that the suppression of alerts after a certain threshold has been reached occur only over a fixed duration of time. In other words, rather than permanently suppressing alerts after the threshold has been reached, or requiring the operator to reset the threshold or count of alerts so that future alerts are not suppressed, in one or more examples, in addition to specifying an alert count threshold that when crossed will cause further alerts to be suppressed (as discussed above), the watch point can also have a duration specified such that the alert count threshold is limited to a specific duration of time that when expired will cause the alert count to reset.

Figure 13:
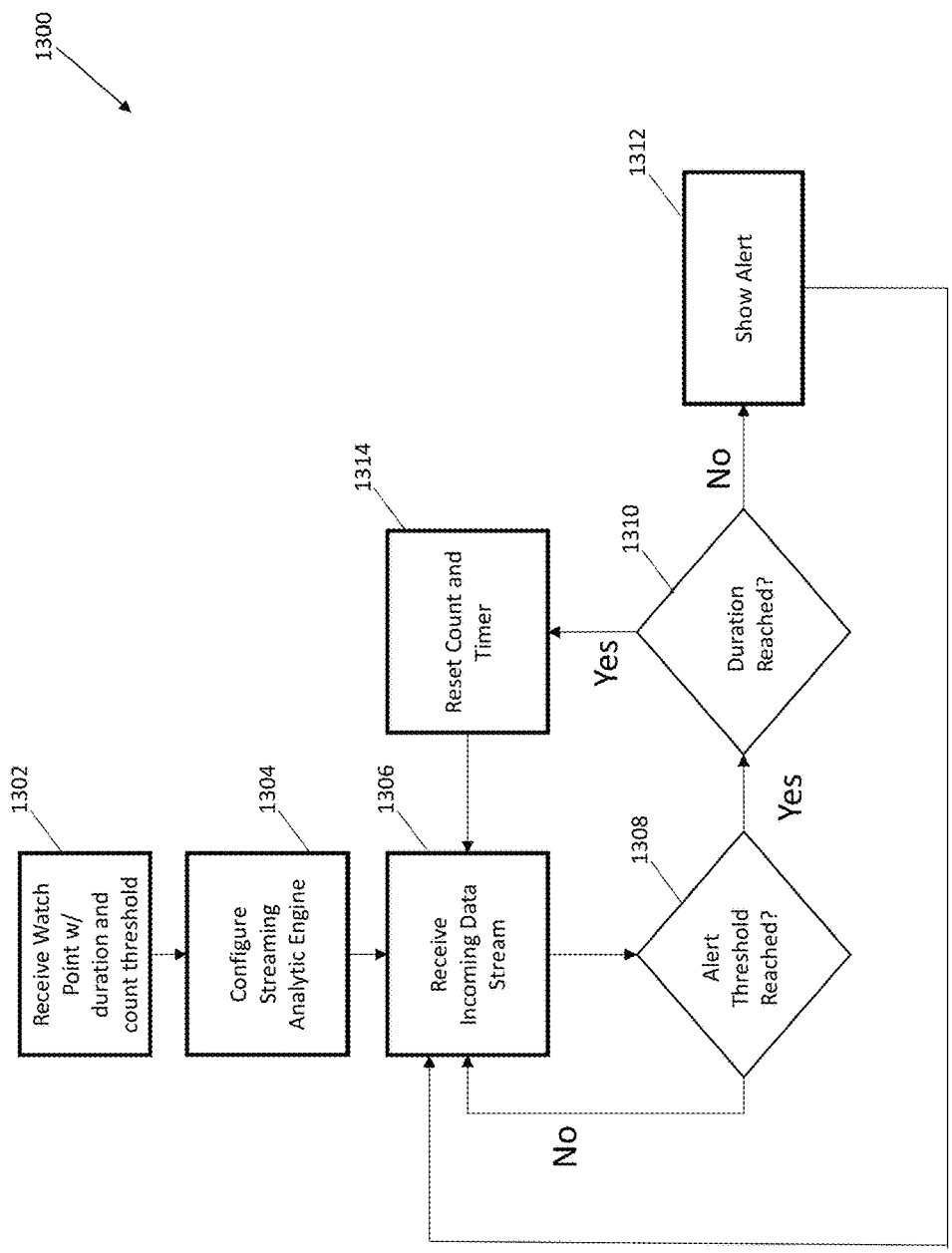
FIG. 13 illustrates an exemplary process for using alert duration suppression to reduce alert fatigue according to examples of the disclosure.

FIG. 13 illustrates an exemplary process for using alert duration suppression to reduce alert fatigue according to examples of the disclosure. In one or more examples, the process 1300 of FIG. 13 can be used to reduce the overall number of alerts received by an operator but also allows for the suppression of alerts to not only be based on the number of alerts over the entire period of analysis, but rather based on the number of alerts that occur over a fixed pre-determined duration of time. In one or more examples, the process 1300 can begin at step 1302, wherein the system (i.e., the edge manager which is configured to manage the edge alerting system) can receive a watch point from a user of the system (i.e., an operator or authorized administrator). In one or more examples, the watch point can include a count threshold value similar to the example process 1200 described above, which sets a threshold for the number of alerts that the watch point has to generate before an alert is shown to the user when being applied to an incoming data stream. As described above, and in one or more examples, the count threshold value specified with the watch point can represent a floor for the number of alerts that are required before the alert is shown to the user for that watch point. In one or more examples, when the alert count threshold is reached, the watch point will no longer be suppressed and instead will be shown to the user for alerts on that data stream. In addition to the count threshold, the watch point received at step 1302 can also include an alert suppression duration threshold. In one or more examples, the alert suppression duration threshold can refer to a specified amount of time during which the count of alerts is tabulated for the purpose of showing the alerts to the user. Thus, in one or more examples, during the duration of time specified in the watch point, the alert count threshold value will increment each time an alert is triggered by the watch point. Once the count threshold is reached, in one or more examples, further alerts can be shown to the user. However, once the duration specified in the watch point has expired (as explained below) the alert count can be reset, and the count can begin again, and alerts can be sent to the operator until the threshold is met or crossed again.

In one or more examples, once the watch point has been received at step 1302, the process 1300 can move to step 1304 wherein the received watch point is deployed to one or more streaming analytic engines so as to be applied to one or more data streams associated with the streaming analytic engine. In one or more examples, each deployment of a watch point (i.e., onto a streaming analytic engine) can each have its own count threshold and duration such that when the data stream associated with the streaming analytic engine generates more alerts than the count threshold and the duration hasn't expired, the alerts for that streaming analytic engine and engendered by the watch point are suppressed. In one or more examples, once the watch point has been deployed to a streaming analytic engine so as to configure the streaming analytic engine at step 1304 the process can move to step 1306 wherein the streaming analytic engines where the watch point is deployed can receive their respective data streams. At step 1306, the data stream can be analyzed to determine if the conditions or patterns specified by the watch point are present within the streaming data. In one or more examples, as a condition that matches the watch point is found, an alert can be sent to the user. Thus, in one or more examples, when an alert is triggered by the watch point during the analysis of the streaming data at step 1306, the process 1300 can move to step 1308, wherein a determination is made as to whether the number of alerts (i.e., the count threshold) associated with the watch point has been reached. In one or more examples, if the number of alerts associated with the watch point for the data stream has not been reached, then the process reverts back to step 1306 wherein the data stream is further analyzed, and more alerts are generated when the condition associated with the watch point is encountered in the streaming data.

In one or more examples, however, if the threshold has been reached at step 1308, then the process 1300 moves to step 1310 wherein a determination is made as to whether the duration specified by the watch point has been reached. In one or more examples, a timer can be initiated when the data stream is received at step 1306. Thus, in one or more examples, step 1310 can include comparing the timer with the duration specified in the watch point to determine whether the duration has expired. In one or more examples, if the duration has not expired, then the process 1300 can move to step 1312 wherein the alert is shown to the user (since the count threshold has already been exceeded). If however, the duration has expired, then in one or more examples, the alert that is being analyzed can be transmitted to the user, and the process can move to step 1314 wherein the wherein the count (i.e., the count of alerts that have been generated by the watch point) and the timer (i.e., the time that is compared to the pre-determined duration) are reset (thus allowing alert through to the operator until the count crosses the threshold). In one or more examples, once the timer and counter have been reset at step 1314, the process can revert to 1306 so that the received data stream can be processed to determine whether conditions matching the watch points deployed on the streaming analytic engine are present within the data stream.

As described above, the methods and techniques described above with respect to FIGS. 12-13 can help to mitigate alert fatigue by reducing the overall number of alerts that may be seen by an operator of an edge computing system. However, the systems and methods described above may not account for whether an alert is a true positive (i.e., indicative of a threat to the edge computing system) or a false positive (an alert that is unlikely to be associated with a cyber threat). In one or more examples, and in certain situations, it may be beneficial to not only reduce the overall number alerts that are seen by an operator, but to reduce the number of alerts by reducing the number of false positive alerts that are seen by the operator. As described in detail below, the use of "seen lists" by a streaming analytics engine can be used to reduce the overall number of alerts that are seen by an operator. In one or more examples, a "seen list" can refer to a list of allowed elements and/or relationships in the edge computing system that can be used to help the streaming analytic engine to determine which alerts generated from its watch points to transmit to the operator for further scrutiny. As described in detail below, the seen-list can be dynamically generated/maintained during operation of the edge computing system, without requiring any modifications to the watch points deployed on a particular analytic streaming engine.

Figure 14:
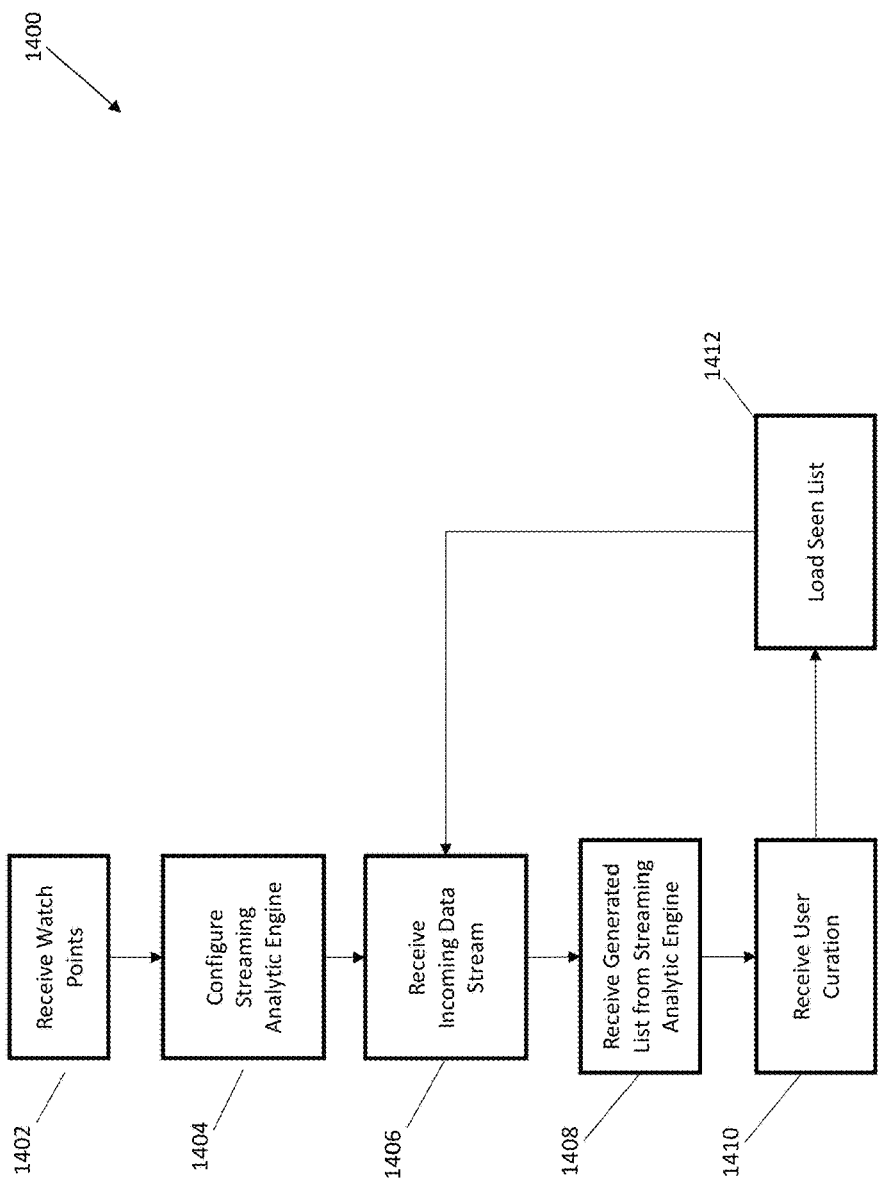
FIG. 14 illustrates an exemplary process for using seen-lists to reduce alert fatigue according to examples of the disclosure.

FIG. 14 illustrates an exemplary process for using seen-lists to reduce alert fatigue according to examples of the disclosure. In one or more examples, the process 1400 of FIG. 14 can be employed during operation of an edge computing system to dynamically build seen-lists that are then applied against alerts generated by one or more watch points deployed on streaming analytic engines to filter out alerts that are likely to be false positives and thus may not require attention from an operator of the edge computing system. In one or more examples, the process 1400 of FIG. 14 can begin at step 1402 wherein the edge computing system manager receives one or more watch points, similar to the manner described above. In one or more examples, the watch points can include specifications of conditions or patterns to be searched for within the streaming data be passed back and forth between components of the edge computing system. In one or more example, once the one or more watch points are received at step 1402, the process 1400 can move to step 1404 wherein the received watch points are deployed to the one or more streaming analytic engines, in a manner similar to that described above. In one or more examples, once the watch points have been deployed to their respective streaming analytic engines at step 1404, the process 1400 can move to step 1406 wherein the incoming data stream associated with each streaming analytic engine is received by the streaming analytic engine.

As described above, with the watch points deployed and operational, the operator will begin to receive alerts from the streaming analytic engines indicating that one or more conditions specified by a watch point are present within the received streaming data. In one or more examples, and as described above, these alerts can be numerous and contain many false positives, thus causing alert fatigue for the operator. Thus, in one or more examples, the process 1400 can use a "seen list" that can be applied to the alerts generated by watch points so as to filter them out before they are presented to the operator thereby reducing the overall number of alerts that an operator is exposed to and thereby minimizing alert fatigue.

In one or more examples, during the processing of the incoming streaming data received at step 1406, the process 1400 can move to step 1408 wherein one or more "generated lists" are received from the streaming analytic engine. In one or more examples, a generated list can refer to a list of various elements and relationships in the edge computing system that are ascertained using the streaming data received at step 1406. In one or more examples, a "generated list" can be generated by the streaming analytic engines and represent various components and relationships between components that are gleaned from the incoming data stream. In one or more examples, the "generated list" can be based on one or more seen-lists. As discussed above, a seen-list can refer to a list of components and/or relationships between components that have been established or verified by the operator as being legitimate components and/or relationships between components associated with the operation of the edge computing system. Thus, in one or more examples, the generated list produced by the streaming analytic engine at step 1408 can include components and relationships between components that have not been previously cleared via a previous seen-list.

As an example of the information that could be contained within a generated list, and specifically an example of the components and relationships described above, a generated list can include single items such as Internet Protocol (IP) addresses or media access control (MAC) addresses of the various components that messages are transmitted to and from. The generated list may also contain relations such as links between IP addresses or MAC addresses, or relationships between an IP address and a MAC address. The above are meant as examples only and are not meant to be limiting to the disclosure.

In one or more examples, the generated list can be generated using one or more seen-lists that have been previously generated. In one or more examples, a seen-list can be used more as an allowed set of elements or relationships. In one or more examples, using the seen-list can result in substantially less alerting by the edge computing system manager because (1) the analytic engine will not alert if anything in the seen-list occurs in the incoming data stream, and (2) the analytic engine will not alert if anything in the current generated list occurs in the data stream until and unless the operator is alerted to a change in configuration not already listed in the generated list, and subsequently the operator curates the generated-list so as to convert the generated list into a seen-list (as discussed below). In one or more examples, the generated list can be continuously updated as the incoming data stream comes in, and the operator can decide at any time asynchronously to use the current generated list to update the seen-list. Except for the initial loading of the seen-list that occurs without operator intervention, all other updates to the seen-list are explicitly controlled by the operator. The operator may be a human being, or an agent acting as a human with appropriate authentication and authorization to edit and create the seen-list using the generated list.

If no prior seen-list has been generated by the user, for instance upon initialization of the system, in one or more examples, an initial seen-list can be loaded into the system prior to initialization of the system. In one or more examples, the generated list created at step 1408 can be generated using machine learning. In one or more examples, a machine learning model which can take both the seen-list and the incoming data stream as inputs and identify any components or relationships that may require the operator's attention based on the received data stream and the current version of the seen-list. In one or more examples, the generated list created at step 1408 can also be based on a statistical analysis of the incoming data stream, wherein the statistical analysis also incorporates the current seen-list.

In one or more examples, once the generated list is received at step 1408, the process 1400 can move to step 1410 wherein the user/operator of edge computing system manager can curate/edit the generated list by approving or authorizing any relationships or components found in the generated list. In one or more examples, instead of authorizing or approving relationships and/or components found in the generated list so that they don't cause alerts, instead the user can identify any unauthorized relationships/components. In this way, the seen-list can represent a list of disallowed relationships that can be used by the system to generate future generated lists. In one or more examples, once the user curates the generated list at step 1410, the process 1400 can move to step 1412 wherein the curated generated list is loaded into the streaming analytic engines as an update to the current seen-list. Thus, the updated seen-list, in one or more examples, can be used by the streaming analytic engine to suppress alerts to the user based on if the alert was triggered by components and/or relationships appearing on the seen-list. In one or more examples, once the seen-list (or the update to the seen-list) is loaded at step 1412 onto the one or more streaming analytic engines, the process 1400 can revert back to step 1406 wherein the incoming data stream is further analyzed to generate additional "generated lists" wherein the generated lists are also now based on the newly received modifications to the seen-list provided by the user's curation of the previously created "generated list."

Figure 15:
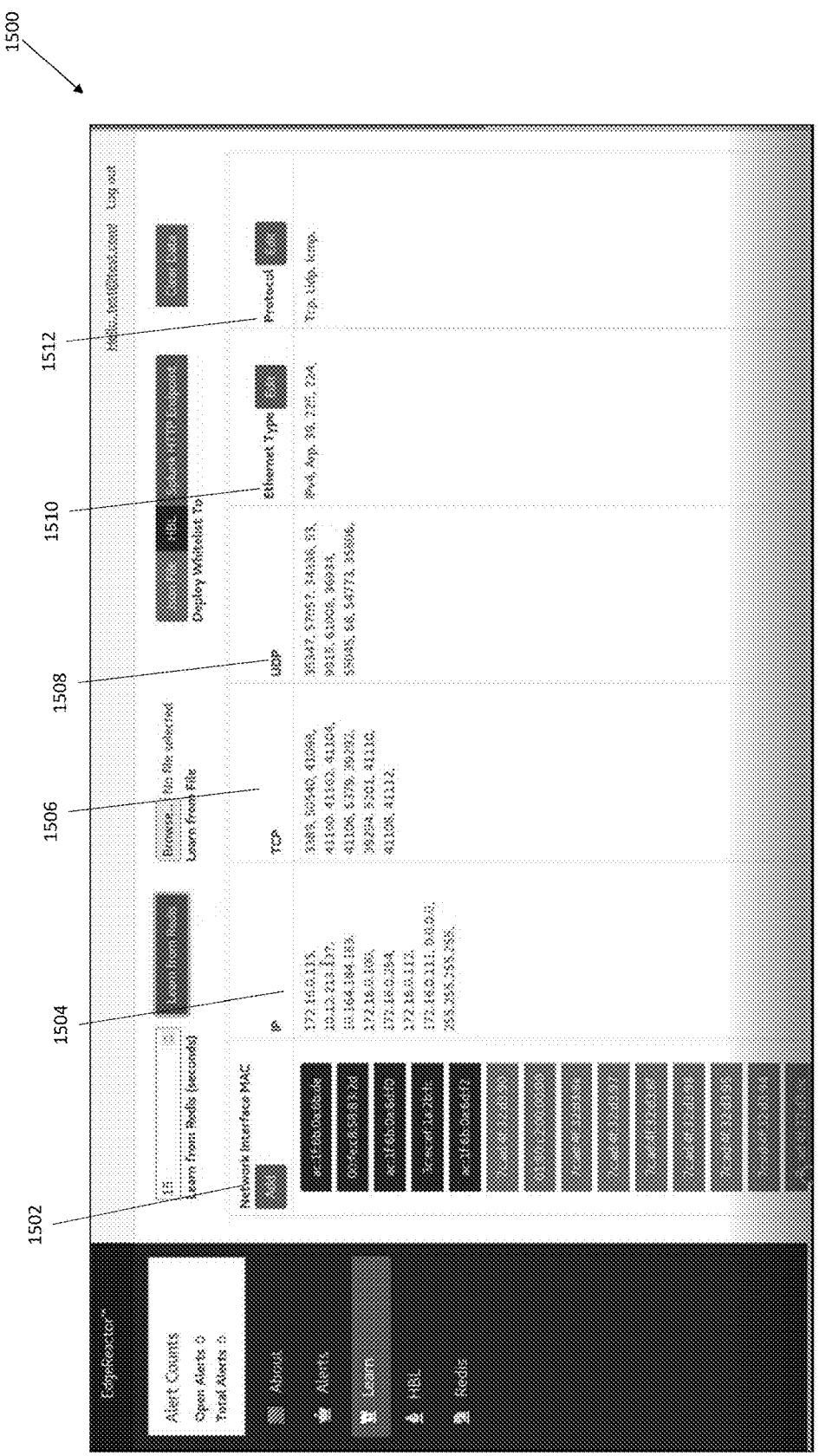
FIG. 15 illustrates an exemplary generated/seen list according to examples of the disclosure.

FIG. 15 illustrates an exemplary generated list according to examples of the disclosure. In one or more examples, the generated list 1500 of FIG. 15 can represent an exemplary generated list received at step 1408. As described above, the generated list 1500 can include one or more components and/or relationships between components that are found in the incoming data stream. For instance, in one or more examples, the generated list can include the MAC addresses for each component found to be communicating in the incoming data stream as show in the example generated list 1500 at 1502. In one or more examples, the list 1500 can also include a list of all IP addresses associated the communications as indicated at 1504. In one or more examples, the list 1500 can include a list of TCE addresses (1506), a list of all UDP addresses (1508), a list of all Ethernet types (1510) and a list of all protocols (1512) associated with the data received in the streaming data.

In one or more examples, each individual analytic engine can be configured to extract the information found in the generated lists from the streaming data itself. Thus, in one or more examples, in addition to the actual messages being passed between components in the edge computing system, the streaming data can also include component and relationship information, that the streaming analytic engine can extract from the messages to populate the generated list. In one or more examples, and as described above, each streaming analytic engine can not only extract the information to populate the generated list, but can also determine which of the extracted information to populate onto the generated list based on the current seen-list as well as any statistical or machine learning models applied to the incoming data stream that are configured to determine what information to populate onto the generated list.

In one or more examples, in addition to seen-lists, the process 1400 of FIG. 14 can also be employed to generate other types of lists. For instance, in one or more examples, the systems and methods described above can be implemented to facilitate configuration learning in which multiple seen-lists generated by the process 1400 of FIG. 14 can be used to determine if any new devices or new communication patterns have emerged from the incoming data stream. If such new devices or new communication patterns are detected, they can be provisionally added to a configuration model of the edge computing system. The user then can be presented with the additions and can decide whether the additions are legitimate and authorized thereby adding them to the configuration model. Thus, in substantially the same manner as the seen-lists, the configuration model can be updated dynamically and incrementally over time and can reflect the overall configuration (i.e., components and relationships between components) of the edge computing system.

In one or more examples, the configuration model can be used in conjunction with the seen-lists to help create the generated lists received at step 1408 of process 1400 of FIG. 14. Additionally, the configuration model can be directly used to suppress alerts generated by a watch point. For instance, if a watch point generates an alert, in one or more examples, the alert can be suppressed based on either the seen-list, the configuration model, or both. Thus, in one or more examples, if an alert involves a set of components and a relationship between components that is found in the configuration model, then the alert can be suppressed (i.e., not presented to the user)

In one or more examples, and as described above, the configuration list can be created in substantially the same process as the seen-lists, but instead of the user receiving generated lists that they curate to create seen-lists, the user can create configuration lists that they can then curate to create or modify a configuration model. Through the process of loading and using the operator curated configuration model consisting of multiple seen-lists, the streaming analytic engine learns the newer system configuration and therefore generates less alerts based on what is in the configuration model. In one or more examples, an initial configuration model can be created to seed the process in substantially the same manner as an initial seen-lists can be used to seed the process 1400 of FIG. 14 described above. In one or more examples, the seed configuration model (i.e., the initial configuration model) can be generated either offline or online. In one or more examples, offline configuration learning can occur when the initial seeded configuration model is created outside of the system using previously collected or expected configuration data. In one or more examples, online configuration learning can occur when the streaming engine is switched to a learning mode for fixed period of time and generates a "generated configuration model" that is used as the initial seeded configuration.

In one or more examples, and additionally or alternatively to the seen-list and configuration model described above, in one or more examples, the process 1400 can be used to generate a behavior model of the edge computing system. The behavior model can be generated and maintained in the same manner as the seen-lists and configuration model but can contain information regarding elements and relationships in the behavior of the system. In one or more examples, the behavior model in addition to including information about the components in an edge computing system and the relationships between the components, the behavior model can include information about the periodicity of the relationships and/or event occurrence in the components of the edge computing system. In one or more examples, the behavior model can be used as an expected event guide that can ultimately be used to suppress alerts that are transmitted to the operator. In one or more examples, if an event occurs that generates an alert, the event can be compared against the behavior model to determine whether the event was an expected event based on the time period in which the event occurred. In one or more examples, the initial behavior model can be generated both offline and online in a manner described above with respect to configuration lists.

Figure 16:
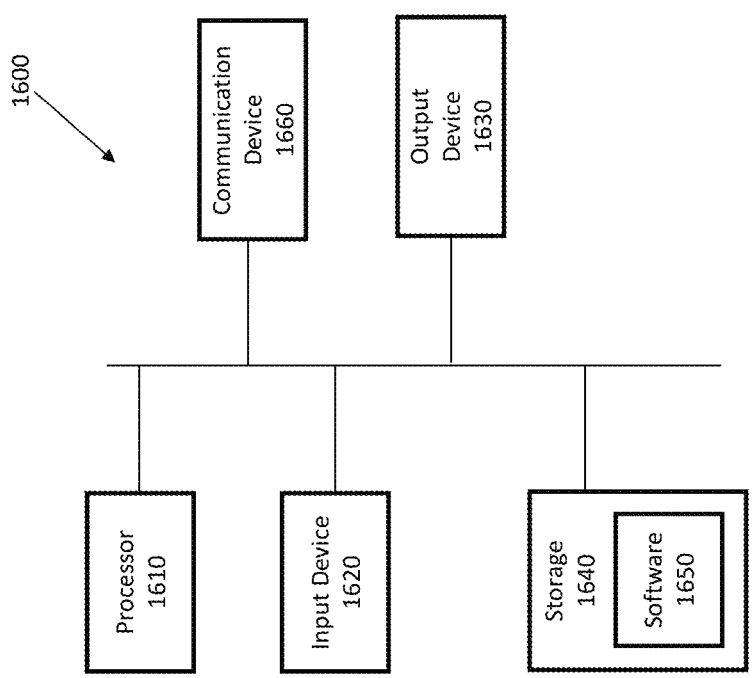
FIG. 16 illustrates an example of a computing device in accordance with one or more examples of the disclosure.

FIG. 16 illustrates an example of a computing device in accordance with one embodiment. Device 1600 can be a host computer connected to a network. Device 1600 can be a client computer or a server. As shown in FIG. 16, device 1600 can be any suitable type of microprocessor-based device, such as a personal computer, workstation, server, or handheld computing device (portable electronic device) such as a phone or tablet. The device can include, for example, one or more of processor 1610, input device 1620, output device 1630, storage 1640, and communication device 1660. Input device 1620 and output device 1630 can generally correspond to those described above and can either be connectable or integrated with the computer.

Input device 1620 can be any suitable device that provides input, such as a touch screen, keyboard or keypad, mouse, or voice-recognition device. Output device 1630 can be any suitable device that provides output, such as a touch screen, haptics device, or speaker.

Storage 1640 can be any suitable device that provides storage, such as an electrical, magnetic, or optical memory, including a RAM, cache, hard drive, or removable storage disk. Communication device 1660 can include any suitable device capable of transmitting and receiving signals over a network, such as a network interface chip or device. The components of the computer can be connected in any suitable manner, such as via a physical bus or wirelessly.

Software 1650, which can be stored in storage 1640 and executed by processor 1610, can include, for example, the programming that embodies the functionality of the present disclosure (e.g., as embodied in the devices as described above).

Software 1650 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1640, that can contain or store programming for use by or in connection with an instruction execution system, apparatus, or device.

Software 1650 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 1600 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 1600 can implement any operating system suitable for operating on the network. Software 1650 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

This application discloses several numerical ranges in the text and figures. The numerical ranges disclosed inherently support any range or value within the disclosed numerical ranges, including the endpoints, even though a precise range limitation is not stated verbatim in the specification, because this disclosure can be practiced throughout the disclosed numerical ranges.

The above description is presented to enable a person skilled in the art to make and use the disclosure, and it is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown but is to be accorded the widest scope consistent with the principles and features disclosed herein. Finally, the entire disclosure of the patents and publications referred in this application are hereby incorporated herein by reference.

What is claimed is:

1. A method for reducing a number of alerts provided to an edge computing system operator, the method comprising:
   receiving one or more messages transmitted between a plurality of components of the edge computing system;
   receiving a list of information that comprises information about one or more components identified in the received one or more messages;
   receiving one or more modifications to the received list of information from the edge computing system operator to generate a seen-list, wherein the seen-list comprises one or more components in the list of information that has been authorized by the edge computing system operator;
   receiving one or more specifications of conditions to search for within the received one or more messages;
   converting the one or more specifications of conditions into one or more watch points, wherein each watch point defines a pattern to be searched for in the one or more messages transmitted between the plurality of components;
   determining the presence of one or more patterns within the received one or more messages based on the one or more watch points; and
   if the one or more patterns within the received one or more messages are determined to be present:
   generating an alert; and
   suppressing the alert from being transmitted to the edge computing system operator based on a comparison between the one or more patterns in the received one or more messages and the seen-list.

2. The method of claim 1, wherein the received list of information comprises one or more relationships between the one or more components of the edge computing system.

3. The method of claim 1, wherein the information about the one or more components identified in the received one or more messages comprises a plurality of MAC addresses, each MAC address associated with a component of the plurality of components of the edge computing system contained within the received list of information.

4. The method of claim 1, wherein the information about the one or more components identified in the received one or more messages comprises a plurality of IP addresses, each IP address associated with a component of the plurality of components of the edge computing system contained within the received list of information.

5. The method of claim 1, wherein the method comprises receiving a second list of information about the received one or more messages transmitted between a plurality of components of the edge computing system, wherein the second list of information is generated by comparing the received one or more messages to the seen-list.

6. The method of claim 5, wherein the method comprises receiving one or more modifications to the received second list of information from the edge computing system operator to generate one or more modifications to the seen-list.

7. The method of claim 1, wherein the received list of information is generated using one or more machine learning models that are applied to the received one or more messages.

8. A computing system for reducing an amount of alerts provided to an edge computing system operator, the system comprising:
   a display;
   a user interface configured to receive inputs from a user of the system;
   a memory;
   one or more processors; and
   one or more programs, wherein the one or more programs are stored in the memory and configured to be executed by the one or more processors, the one or more programs when executed by the one or more processors cause the processor to:
   receive one or more messages transmitted between a plurality of components of the edge computing system;
   receive a list of information that comprises information about one or more components identified in the received one or more messages;
   receive one or more modifications to the received list of information from the edge computing system operator to generate a seen-list, wherein the seen-list comprises one or more components in the list of information that has been authorized by the edge computing system operator;
receive one or more specifications of conditions to search for within the received one or more messages;
convert the one or more specifications of conditions into one or more watch points, wherein each watch point defines a pattern to be searched for in the one or more messages transmitted between the plurality of components;
determine the presence of one or more patterns within the received one or more messages based on the one or more watch points; and
if the one or more patterns within the received one or more messages are determined to be present:
generate an alert; and
suppress the alert from being transmitted to the edge computing system operator based on a comparison between the one or more patterns in the received one or more messages and the seen-list.

9. The system of claim 8, wherein the received list of information comprises one or more relationships between the one or more components of the edge computing system.

10. The system of claim 8, wherein the information pertain about the one or more components identified in the received one or more messages comprises a plurality of MAC addresses, each MAC address associated with a component of the plurality of components of the edge computing system contained within the received list of information.

11. The system of claim 10, wherein the one or more processors are caused to receive one or more modifications to the received second list of information from the edge computing system operator to generate one or more modifications to the seen-list.

12. The system of claim 8, wherein the information about the one or more components identified in the received one or more messages comprises a plurality of IP addresses, each IP address associated with a component of the plurality of components of the edge computing system contained within the received list of information.

13. The system of claim 8, wherein the one or more processors are caused to receive a second list of information about the received one or more messages transmitted between a plurality of components of the edge computing system, wherein the second list of information is generated by comparing the received one or more messages to the seen-list.

14. The system of claim 8, wherein the received list of information is generated using one or more machine learning models that are applied to the received one or more messages.

15. A non-transitory computer readable storage medium storing one or more programs for reducing an amount of alerts provided to an edge computing system operator, the one or more programs comprising instructions, which, when executed by an electronic device with a display and a user input interface, cause the device to:
receive one or more messages transmitted between a plurality of components of the edge computing system;
receive a list of information that comprises information about one or more components identified in the received one or more messages;
receive one or more modifications to the received list of information from the edge computing system operator to generate a seen-list, wherein the seen-list comprises one or more components in the list of information that has been authorized by the edge computing system operator;
receive one or more specifications of conditions to search for within the received one or more messages;
convert the one or more specifications of conditions into one or more watch points, wherein each watch point defines a pattern to be searched for in the one or more messages transmitted between the plurality of components;
determine the presence of one or more patterns within the received one or more messages based on the one or more watch points; and
if the one or more patterns within the received one or more messages are determined to be present:
generate an alert; and
suppress the alert from being transmitted to the edge computing system operator based on a comparison between the one or more patterns in the received one or more messages and the seen-list.

16. The non-transitory computer readable storage medium of claim 15, wherein the received list of information comprises one or more relationships between the one or more components of the edge computing system.

17. The non-transitory computer readable storage medium of claim 15, wherein the information about the one or more components identified in the received one or more messages comprises a plurality of MAC addresses, each MAC address associated with a component of the plurality of components of the edge computing system contained within the received list of information.

18. The non-transitory computer readable storage medium of claim 15, wherein the information about the one or more components identified in the received one or more messages comprises a plurality of IP addresses, each IP address associated with a component of the plurality of components of the edge computing system contained within the received list of information.

19. The non-transitory computer readable storage medium of claim 15, wherein the one or more processors are caused to receive a second list of information about the received one or more messages transmitted between a plurality of components of the edge computing system, wherein the second list of information is generated by comparing the received one or more messages to the seen-list.

20. The non-transitory computer readable storage medium of claim 19, wherein the one or more processors are caused to receive one or more modifications to the received second list of information from the edge computing system operator to generate one or more modifications to the seen-list.

21. The non-transitory computer readable storage medium of claim 15, wherein the received list of information is generated using one or more machine learning models that are applied to the received one or more messages.

* * * * *